(12) United States Patent
Yasui et al.

(10) Patent No.: US 11,567,293 B2
(45) Date of Patent: Jan. 31, 2023

(54) AUTOFOCUS DEVICE, AND OPTICAL APPARATUS AND MICROSCOPE INCLUDING THE SAME

(71) Applicant: RIKEN, Saitama (JP)

(72) Inventors: Masato Yasui, Saitama (JP); Michio Hiroshima, Saitama (JP); Masahiro Ueda, Saitama (JP)

(73) Assignee: RIKEN, Saitama (JP)

( * ) Notice: Subject to any disclaimer, the term of this patent is extended or adjusted under 35 U.S.C. 154(b) by 152 days.

(21) Appl. No.: 16/967,814

(22) PCT Filed: Jan. 24, 2019

(86) PCT No.: PCT/JP2019/002216
§ 371 (c)(1),
(2) Date: Aug. 6, 2020

(87) PCT Pub. No.: WO2019/159627
PCT Pub. Date: Aug. 22, 2019

(65) Prior Publication Data
US 2021/0041659 A1 Feb. 11, 2021

(30) Foreign Application Priority Data
Feb. 14, 2018 (JP) .............................. JP2018-024408

(51) Int. Cl.
*G02B 7/32* (2021.01)
*G02B 21/26* (2006.01)
(Continued)

(52) U.S. Cl.
CPC ............. *G02B 7/32* (2013.01); *G02B 21/244* (2013.01); *G02B 21/26* (2013.01); *G03B 13/36* (2013.01); *H04N 5/2254* (2013.01); *H04N 5/232* (2013.01)

(58) Field of Classification Search
CPC ........ G02B 21/244; G02B 21/26; G02B 7/32; G03B 13/36; H04N 5/2254; H04N 5/232
(Continued)

(56) References Cited

U.S. PATENT DOCUMENTS 6,396,628 B1    5/2002  Osa et al.
2002/0191281 A1 12/2002  Osa et al.
(Continued)

FOREIGN PATENT DOCUMENTS

CN    1269022 A    10/2000
CN    1655000 A     8/2005
(Continued)

OTHER PUBLICATIONS

Chinese first Office Action, dated Nov. 22, 2021, for Chinese Patent Application No. 2019800130415 and its English translation.

*Primary Examiner* — Christopher S Kelley
*Assistant Examiner* — Kathleen M Walsh
(74) *Attorney, Agent, or Firm* — Barnes & Thornburg LLP; Jeffrey R. Stone

(57) ABSTRACT

An autofocus device includes a stage, a magnifying optical system, a light source device, an iris which is arranged at a position opposite to a sample of the magnifying optical system and configured to limit a light beam emitted from the light source device, and an AF camera which receives, via the magnifying optical system, a reflected light beam which is reflected from a reflection surface after the light beam reaches a glass member via the iris and the magnifying optical system. The light source device emits the light beam at a non-zero angle relative to the axis of the magnifying optical system. The control unit adjusts the position of the stage so as to match the position of a captured image of a shield with a target position. With such a configuration, it is possible to achieve the autofocus at high speed.

7 Claims, 19 Drawing Sheets

(51) Int. Cl.
*G03B 13/36* (2021.01)
*H04N 5/225* (2006.01)
*H04N 5/232* (2006.01)
*G02B 21/24* (2006.01)

(58) Field of Classification Search
USPC .......................................................... 349/79
See application file for complete search history.

(56) References Cited

U.S. PATENT DOCUMENTS

| | | | |
|---|---|---|---|
| 2003/0184856 A1* | 10/2003 | Otaki | G02B 7/28 |
| | | | 250/201.3 |
| 2011/0127406 A1* | 6/2011 | Sase | G02B 21/245 |
| | | | 250/201.3 |
| 2011/0188053 A1 | 8/2011 | Buermann et al. | |

FOREIGN PATENT DOCUMENTS

| | | | |
|---|---|---|---|
| CN | 103292690 A | | 9/2013 |
| JP | 1089953 | | 4/1998 |
| JP | 2000162760 A | * | 6/2000 |
| JP | 2003029130 | | 1/2003 |
| JP | 2004004634 | | 1/2004 |
| JP | 2010131614 A | * | 6/2010 |
| JP | 5621259 | | 11/2014 |
| JP | 2015227940 | | 12/2015 |
| JP | 2015227940 A | * | 12/2015 |

* cited by examiner

| | THE FOCAL POINT IS BEHIND THE OBJECT (BEHIND FOCUS) | FOCUS POSITION | THE FOCAL POINT IS BEFORE THE OBJECT (BEFORE FOCUS) |
|---|---|---|---|
| STAGE POSITION |  |  |  |
| CAMERA IMAGE P1 |  |  |  |
| dx | dx<0　XT　X1 | dx=0　X1=XT | dx>0　XT　X1 |

| | THE FOCAL POINT IS BEHIND THE OBJECT (BEHIND FOCUS) | FOCUS POSITION | THE FOCAL POINT IS BEFORE THE OBJECT (BEFORE FOCUS) |
|---|---|---|---|
| STAGE POSITION |  |  |  |
| CAMERA IMAGE P1 |  |  |  |
| dx | dx<0　XT　X1 | dx=0　X1=XT | dx>0　XT　X1 |

| | THE FOCAL POINT IS BEHIND THE OBJECT (BEHIND FOCUS) | FOCUS POSITION | THE FOCAL POINT IS BEFORE THE OBJECT (BEFORE FOCUS) |
|---|---|---|---|
| STAGE POSITION |  |  |  |
| CAMERA IMAGE P1 |  |  |  |
| CAMERA IMAGE P2 |  |  |  |
| dx | dx<0<br>X2　X1 | dx=0<br>X1=X2=XT | dx>0<br>X1　X2 |

AUTOFOCUS DEVICE, AND OPTICAL APPARATUS AND MICROSCOPE INCLUDING THE SAME

TECHNICAL FIELD

The present disclosure relates to an autofocus device, an optical apparatus and a microscope including the autofocus device.

BACKGROUND ART

Generally, the resolution of a microscope is determined by the numerical aperture (NA) thereof. If the numerical aperture is greater, the resolution of the obtained image is higher, but the focal depth will be shorter, and as a result, it is difficult to make the focusing.

The automation of microscopes with a large numerical aperture such as a super-resolution imaging device is not popular. The reason why the automation is not popular is because there is no such a technology that can perform autofocus with high precision, wide range and high speed.

Conventionally, there are many autofocus methods, and they are mainly classified into two kinds to be described in the following. All of these autofocus methods have a problem in focusing precision, focus range and/or focusing speed.

FIG. 30 is a diagram illustrating a first kind of method in the prior art. The first kind of method is based on the contrast of an image of an iris captured by a camera. As illustrated in FIG. 30, in the first kind of method, an iris 502 is arranged at a position conjugate with a sample placed on the bottom surface of a glass container 501, and an image of the iris 502 is formed at the position of the sample (on the bottom surface of the glass container). Then, the image of the iris reflected from the glass surface is captured by a camera 503. The image of the sample is focused by performing a stage scan in which the glass container or the objective lens is moved in the vertical direction so as to focus on the image of the iris. According to the first kind of method, it is possible to automatically focus a microscope with a large numerical aperture at high precision.

The problem with the first kind of method is that the stage scan is required during the focus, which is time-consuming. Depending on the speed of the stage scan, it usually takes about tens of seconds. The stage scan may be eliminated by using a multifocal system that includes two cameras so as to shorten the focus time, it may result in a problem that the range for viewing the image of the iris is narrow.

FIG. 31 is a diagram illustrating a second kind of method in the prior art. The second kind of method performs focus based on the position of a reflected light beam on the glass surface. The light beam from an LED 561 passes through an objective lens 523, and is incident on a sample 522 at an angle. Then, the reflected light beam is captured by a CCD camera 564. In the second kind of method, since the beam position may be controlled to the center, the focus may be maintained constantly.

The problem with the second kind of method is that the focus precision is poor. The poor focus precision is caused by the distortion of the optical system. If the position of the light beam deviates by X due to the distortion of the optical system, then the position of the incident light beam deviates by X/magnification. Since such deviation may be caused by various external factors such as heat and vibration, it is necessary to adjust the offset every time. Further, the focus range and the focus precision depend on the angle at which the light beam is incident on the glass surface S.

Therefore, it is a dilemma to decide which one of the focus range and the focus precision should be prioritized.

CITATION LIST

Patent Literature

PTL 1: Japanese Patent Laying-Open No. 2015-227940
PTL 2: Japanese Patent No. 5621259

SUMMARY OF INVENTION

Technical Problem

Conventionally, it was difficult to perform autofocus with high precision, wide range and high speed at the same time. However, the three factors are necessary for the automation of microscopes with a large numerical aperture for the following reasons. First, since the microscope with a large numerical aperture has a short focal depth, if it is not automatically focused with high precision, the image will be blurred. In addition, if the focus precision cannot be maintained for a long time, it is required to perform focusing every time, which reduces automation level. Secondly, a gap between the sample to be observed and the objective lens may vary at the time of moving the stage. If the gap does not fall within the focus range, the autofocus cannot be performed. Thirdly, in order to image a sample efficiently, it is required to perform focusing quickly. As described above, a technology to perform autofocus with high precision, wide range and high speed is indispensable for the automation of microscopes.

An object of the present disclosure is to provide an autofocus device capable of perform autofocus with high precision, wide range and high speed even in a microscope with a large numerical aperture, and an optical apparatus and a microscope including the autofocus device.

According to one aspect, the present disclosure provides an autofocus device used in an optical apparatus equipped with a stage that supports a transparent member on which an observation object is placed, and a magnifying optical system which is used to observe the observation object. The autofocus device includes: a light source device which emits a light beam to the observation object via the magnifying optical system; a shield which is arranged at a position opposite to the observation object relative to the magnifying optical system and configured to limit the light beam emitted from the light source device; a light detection unit which receives, via the magnifying optical system, a reflected light beam which is reflected from a reflection surface of the transparent member after the light beam emitted from the light source device reaches the reflection surface via the shield and the magnifying optical system; and a control unit which controls the position of the stage or the magnifying optical system. The control unit adjusts the position of the stage or the magnifying optical system based on a reflected light beam from the shield which is obtained by irradiating the observation object with the light beam which is emitted from the light source device and limited by the shield under a plurality of different conditions.

Preferably, the light source device is configured to adjust an angle of the light beam relative to the shield.

Preferably, the autofocus device further includes an optical element which reflects a part of the light beam emitted from the light source device and limited by the shield. The light beam emitted from the light source device and reflected by the optical element is incident on the observation object.

Preferably, the autofocus device further includes an optical element which blocks, attenuates or reflects a part of the light beam emitted from the light source device and limited by the shield. A part of the light beam which is emitted from the light source device and is not blocked, attenuated and reflected by the optical element is incident on the observation object.

More preferably, the control unit determines a control target value from the position of a reflection image of the shield obtained under the plurality of different conditions, and adjusts the position of the stage or the magnifying optical system accordingly.

More preferably, the control unit determines a control target value from a light intensity which is obtained by dividing the image of the shield obtained under a plurality of different conditions into a plurality of sections and integrating the light intensity of each section, and adjusts the position of the stage or the magnifying optical system accordingly.

According to another aspect, the present disclosure provides an autofocus device used in an optical apparatus equipped with a stage that supports a transparent member on which an observation object is placed, and a magnifying optical system which is used to observe the observation object. The autofocus device includes: a light source device which emits a light beam to the observation object via the magnifying optical system; a shield which is arranged at a position opposite to the observation object relative to the magnifying optical system and configured to limit the light beam emitted from the light source device; an imaging unit which receives, via the magnifying optical system, a reflected light beam which is reflected from a reflection surface of the transparent member after the light beam emitted from the light source device reaches the reflection surface via the shield and the magnifying optical system; and a control unit which controls the position of the stage or the magnifying optical system. The light source device emits the light beam at a non-zero angle relative to the axis of the magnifying optical system. The control unit adjusts the position of the stage or the magnifying optical system so as to match the position of an image of the shield captured by the imaging device with a target position.

Preferably, the control unit adjusts the position of the stage or the magnifying optical system so as to match the position of an aperture of the shield in the image of the shield captured by the imaging device with the target position.

Preferably, the control unit performs an image processing on the image captured by the imaging device to separate the outside of the aperture from the inside of the aperture in the image of the shield.

Preferably, the light source device is configured to adjust an angle of the light beam relative to the shield, and the control unit is configured to adjust the position of the stage or the magnifying optical system so as to make a difference between a first position of an image of the shield and a second position of an image of the shield equal to a target value, the first position being obtained when the light beam is emitted from the light source device at a first angle, and the second position being obtained when the light beam is emitted from the light source device at a second angle different from the first angle.

Preferably, the light source device is configured to adjust an angle of the light beam relative to the shield, and the control unit is configured to roughly adjust the position of the stage or the magnifying optical system based on a first position of an image of the shield when the light beam is emitted from the light source device at a first angle, and finely adjust the position of the stage or the magnifying optical system based on a second position of an image of the shield when the light beam is emitted from the light source device at a second angle larger than the first angle.

More preferably, the light source device includes a light source which emits a light beam with a high linearity and an electric optical element configured to receive a light beam emitted from the light source and adjust an incident angle of the light beam emitted from the light source device toward the shield, and the control unit is configured to adjust the angle of the electric optical element in the case when the angle of the light beam emitted from the light source device is equal to the first angle different from the case when the angle of the light beam emitted from the light source device is equal to the second angle.

Preferably, the magnifying optical system includes an objective lens, a half mirror, a light source-side imaging lens arranged on one optical path of an optical path for a light beam passed through the half mirror and an optical path for a light beam reflected by the half mirror, and a camera-side imaging lens arranged on the other optical path of an optical path for a light beam passed through the half mirror and an optical path for a light beam reflected by the half mirror.

Preferably, the light source device emits a polarized light beam, and the magnifying optical system includes an objective lens, a quarter-wave plate, a polarized beam splitter, and an imaging lens arranged between the quarter-wave plate and the polarized beam splitter.

Preferably, the control unit adjusts the position of the stage or the magnifying optical system based on the coordinates of the centroid of the aperture in the image of the shield.

Preferably, the control unit adjusts the position of the stage or the magnifying optical system based on the coordinates of an edge of the aperture in the image of the shield.

According to still another aspect, the present disclosure provides an optical apparatus including a stage, a magnifying optical system, and an autofocus device described above.

According to yet another aspect, the present disclosure provides an optical apparatus including a stage, a magnifying optical system, and an autofocus device described above.

Advantageous Effects of Invention

According to the present disclosure, it is possible to perform autofocus with high precision, wide range and high speed. According to the present disclosure, it is possible to facilitate the automation of a microscope with a large numerical aperture.

DESCRIPTION OF EMBODIMENTS

Figure 1:
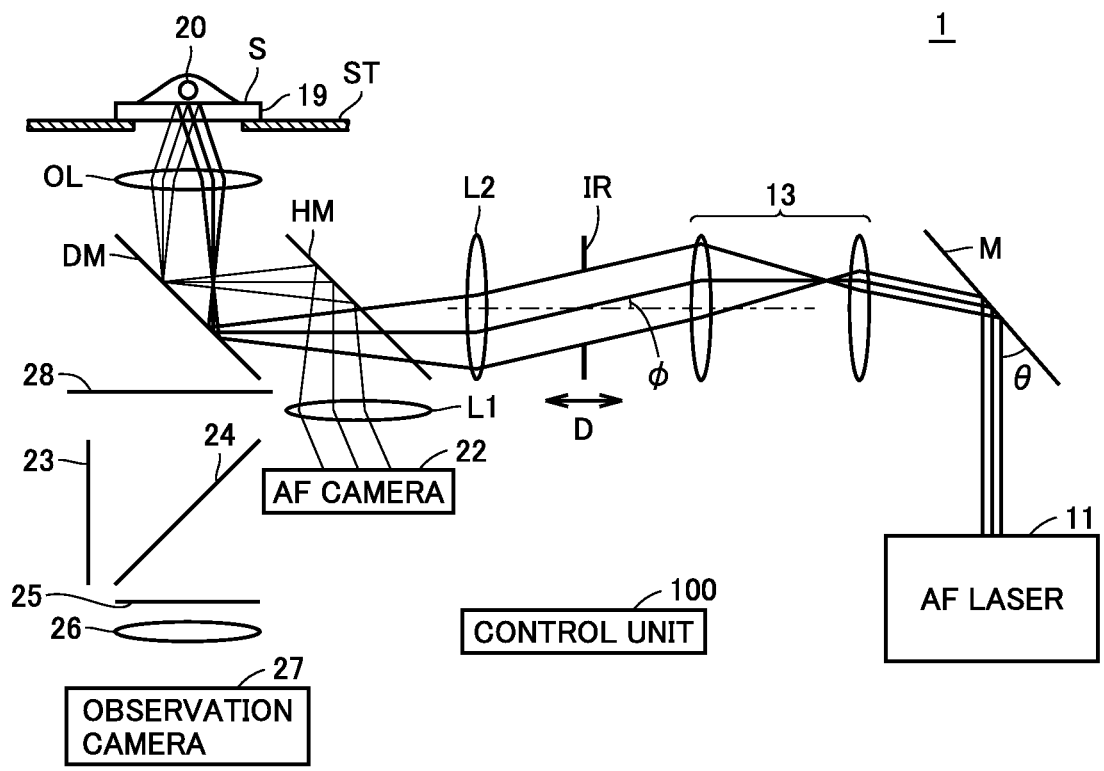
FIG. 1 is a diagram illustrating the configuration of an optical system in a microscope according to the present embodiment.

Hereinafter, embodiments of the present disclosure will be described with reference to the drawings. In the following drawings, the same or corresponding parts will be denoted by the same reference numerals, and the description thereof will not be repeated.

[Overview]

The present embodiment relates to an "autofocus device with high precision, wide range and high speed". FIG. 1 is a diagram illustrating the configuration of an optical system in a microscope according to the present embodiment. The laser beam from an AF laser 11 is reflected by an electric mirror M and is incident on an iris IR. Since the iris IR is conjugate with the electric mirror M, the angle ϕ of the light beam incident on the iris IR may be controlled by adjusting the angle θ of the electric mirror M. The light beam from the iris IR passes through an imaging lens L2 and an objective lens OL and reaches a surface (a glass surface S) of a glass 19 on which a sample 20 is mounted, and is thereafter reflected from the surface. The reflected light beam passes through the objective lens OL and an imaging lens L1, and is imaged by an autofocus camera (AF camera) 22, and thereby, an image of the iris IR is formed on the AF camera 22.

The present embodiment is characterized in that the light beam is shaped and irradiated at an angle onto the glass surface S which is mounted on a stage ST and is configured to support the sample 20, and is observed at the position of the reflection image.

On the other hand, in the first method disclosed in PTL 1, the light beam is vertically irradiated onto the sample without an angle, and the blurriness of the reflection image is observed. The present embodiment is different in that the light beam is irradiated at an angle ϕ and the position of the reflection image is observed. According to the present embodiment, it is possible to determine the deviation amount and the deviation direction of the focal point from the glass surface S by irradiating the incident light beam at an angle and then measuring the position of the image of the iris IR in the reflection image, which leads to faster speed of autofocus.

On the other hand, in the second method disclosed in PTL 2, the light beam is irradiated without being shaped, and the central position of the light beam is observed. The present embodiment is different in that the incident light is shaped by using the iris IR. Since the shape of the image is determined by the iris IR, the reflection image originating from the sample may be erased by an image processing, which leads to higher precision of autofocus. Further, the linearity of the light beam that is irradiated on the glass surface is low in PTL 2. If the linearity of the light beam is low, the image changes remarkably as the focus changes, which makes it difficult to locate the reflected light beam, which reduces the focus range. Furthermore, the present method is different in that the incident angle may be adjusted. By adjusting the incident angle, it is possible to adjust the balance between the focus range and the focus precision.

The autofocus process of the autofocus device according to the present embodiment will be summarized in the following. First, the user determines a distance between a focus position and the glass surface S. Based on the position determined by the user, the iris IR is moved in the D direction. Then, the angle θ of the electric mirror M is set equal to the incident angle ϕL, and the reflection image of the iris IR is captured by the AF camera 22 so as to determine the position of the iris IR on the image. The Z stage or the objective lens OL and another lens (arranged in front of the camera or in front of the iris) or both are moved so that the position of the iris IR matches a target position. The above process is repeated until the difference between the position of the iris IR and the target position is less than or equal to a predefined value. After the autofocus is completed at the incident angle ϕL, the autofocus is performed at another incident angle ϕH which is larger than the incident angle ϕL in the same manner as described above. According to the present method, the autofocus may be performed with higher precision, wider range and higher speed than the conventional method.

First Embodiment

The autofocus device according to the present embodiment is useful in facilitating the automation of a microscope. The microscope 1 illustrated in FIG. 1 includes a stage ST, an autofocus optical system, and an observation optical system.

The autofocus optical system of the microscope 1 includes an AF laser 11, an electric mirror M and a Keplerian beam expander 13 which constitute a light source, an iris IR, an imaging lens L2, a half mirror HM, a dichroic mirror DM, an objective lens OL, an imaging lens L1, and an AF camera 22.

The observation optical system of the microscope 1 includes an excitation filter 23, an observation dichroic mirror 24, an absorption filter 25, an absorption filter 28, an imaging lens 26, and an observation camera 27.

In the autofocus optical system, the laser beam reflected by the electric mirror M passes through the beam expander 13 and enters the iris IR. The incident angle ϕ of the laser beam to the iris IR may be controlled by adjusting the angle θ of the electric mirror M. Since the iris IR is conjugate with the glass surface S, the image of the iris IR is formed on the glass surface S. Then, the image of the iris IR is reflected and projected on the AF camera 22.

The light beam used in the observation optical system has a wavelength that may pass through the dichroic mirror DM for AF and the absorption filter 28. Specifically, the sample 20 is irradiated with a light beam that passes through the observation dichroic mirror 24. Then, the observation camera 27 is used to observe the fluorescence light or the reflected light beam. The absorption filter 28 only absorbs the light beam from the AF light source so as to prevent the leaked light beam from the AF light source from entering the observation camera 27.

The microscope 1 further includes a control unit 100 which controls the angle θ of the electric mirror M, the position of the iris IR in the D direction, and the position of the stage ST. The control unit 100 may control the position of the objective lens OL or the other lens (arranged in front of the camera or in front of the iris) or both instead of the position of the stage ST. For the purpose of explanation, the description will be carried out in the following by assuming that the control unit 100 controls the position of the stage ST.

Figure 2:
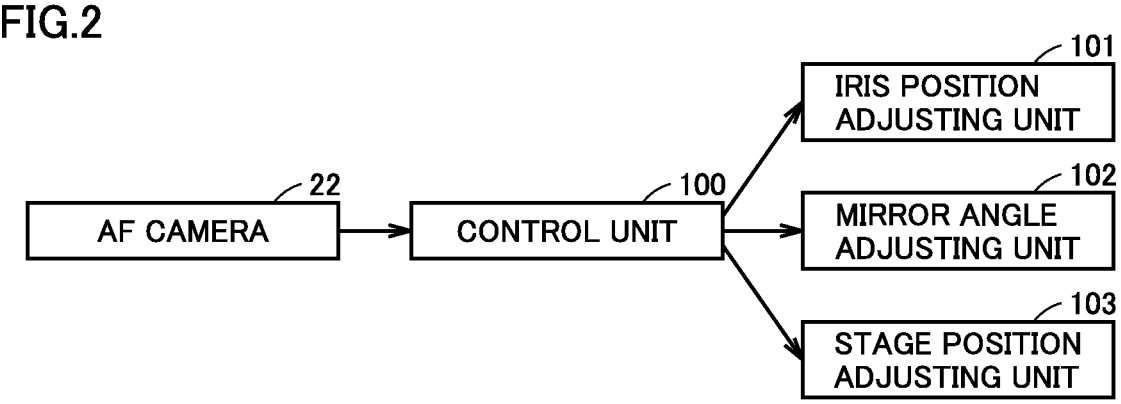
FIG. 2 is a block diagram illustrating elements controlled by a control unit.

FIG. 2 is a block diagram illustrating elements controlled by the control unit. The control unit 100 controls an iris position adjusting unit 101 to adjust the position of the iris IR in the D direction. The control unit 100 controls a mirror angle adjusting unit 102 to adjust the angle θ of the electric mirror M. The control unit 100 controls a stage position adjusting unit 103 based on the position of the image of the iris IR captured by the AF camera 22 to adjust the position of the stage ST in the Z direction.

Figure 3:
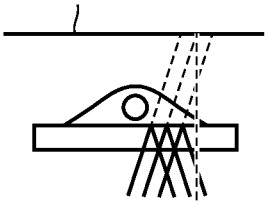
FIG. 3 is a diagram illustrating the principle of autofocus according to a first embodiment.
Figure 3:
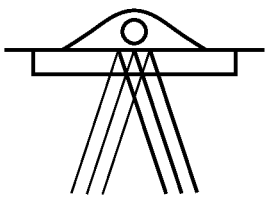
Figure 3:
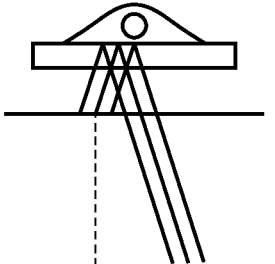
Figure 3:
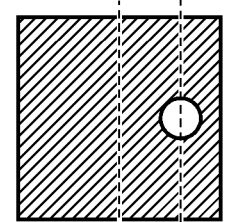
Figure 3:
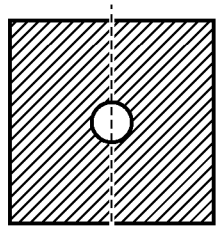
Figure 3:
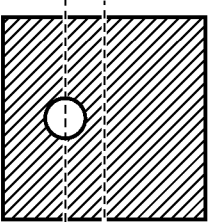

FIG. 3 is a diagram illustrating the principle of autofocus according to the first embodiment. The laser beam is incident on the sample 20 at an incident angle corresponding to the incident angle ϕ of the iris IR. The image of the iris IR is observed by the AF camera 22 as a camera image P1. Depending on the Z position of the glass surface S from the focus position, the position of the image of the iris IR is shifted to the left or to the right in the image.

A target position XT corresponding to the focus position is set in the image of the iris IR in advance, and the difference dx between the position X1 of the image of the iris IR obtained from the camera image P1 and the target position XT is calculated. The focus position is reached when the difference dx is zero. Since the moving direction and the moving amount of the stage ST which supports the glass surface S may be determined from the difference dx, it is possible to perform the autofocus at high speed.

A sensor such as a split photodiode may be used to replace the AF camera 22. However, since the precision of the position of the image of the iris IR determined from a reflection image is reduced, the precision of the autofocus will be reduced.

The image of a sample such as cells to be observed is visible from an aperture of the iris IR. Therefore, the image of the aperture of the iris IR depends on the sample such as cells, and the reflection image of the iris IR is not uniform. Therefore, if the position of the image of the iris IR is determined by using the weighted centroid of a split photodiode, the focus is deviated depending on the image of the sample. In order to solve this problem and improve the precision of autofocus, it is preferable that an image processing (for example, binarization processing or contour extraction processing) is performed to separate the image in such a manner that the aperture portion is white and the shielded portion by the iris IR is black. This enables highly precise autofocus independent of the sample.

Figure 4:
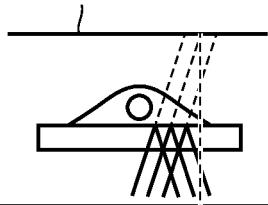
FIG. 4 is a diagram illustrating a modified example in which a slit is used to replace the iris in the first embodiment.
Figure 4:
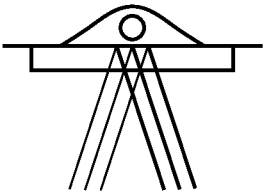
Figure 4:
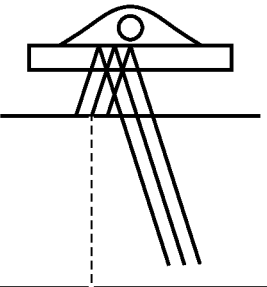
Figure 4:
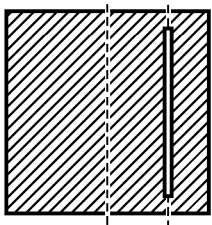
Figure 4:
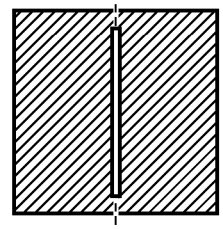
Figure 4:
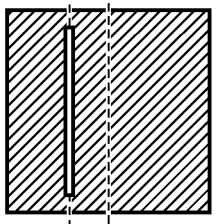

FIG. 4 is a diagram illustrating a modified example in which a slit is used to replace the circular iris in the first embodiment. In the case of FIG. 3, the difference dx is calculated from the weighted centroid position of the image of the iris IR. However, in the case of a slit, the difference dx may be calculated by using the X coordinate of the image directly or X1 that may be calculated by a simple calculation. The iris IR may be various shapes such as a star shape or a polygonal shape in addition to the circular shape in FIG. 3 and the slit shape in FIG. 4.

In the present embodiment, the autofocus may be performed by fixing the incident angle ϕ at a predetermined non-zero angle. After the incident angle ϕ is fixed, the position of the image of the iris IR is measured. Then, the stage ST is moved to adjust the focus position so that the position of the image of the iris IR matches the target position. In this manner, since the autofocus is performed without changing the angle of the electric mirror M, the autofocus may be performed at high speed, and the driving unit of the electric mirror M may be prevented from being worn out.

Figure 5:
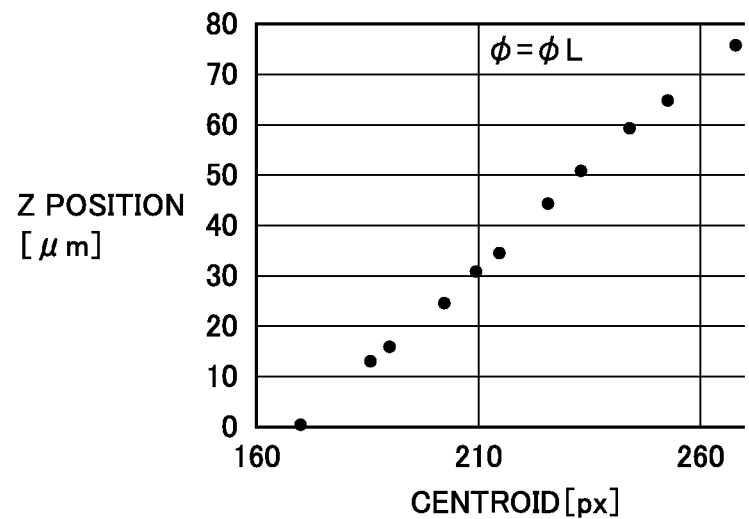
FIG. 5 is a diagram illustrating the relationship between the centroid position of an image of the iris and the position of the stage when the incident angle is $\phi L$.
Figure 6:
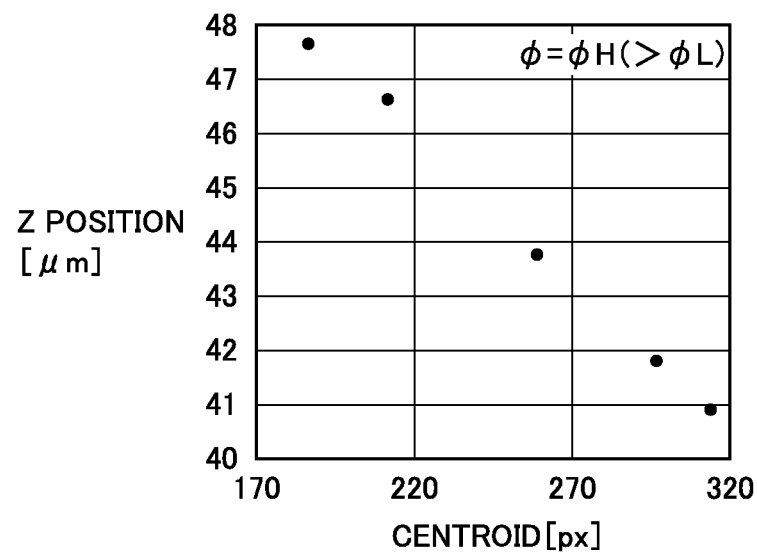
FIG. 6 is a diagram illustrating the relationship between the centroid position of the image of the iris and the position of the stage when the incident angle is ϕH (ϕH>ϕL)

On the other hand, since the incident angle ϕ of the iris IR may be changed during the autofocus, it is possible to adjust the focus precision and the focus range, will be described by comparing the case where the incident angle ϕ is large with the case where the incident angle ϕ is small. FIG. 5 is a diagram illustrating the relationship between the centroid position of the image of the iris and the position of the stage when the incident angle is φL. FIG. 6 is a diagram illustrating the relationship between the centroid position of the image of the iris and the position of the stage when the incident angle is φH (φH>φL). In FIGS. 5 and 6, the horizontal axis represents the pixel (px) position indicating the centroid of the image of the iris IR, and the vertical axis represents the position (μm) in the Z direction of the stage that moves the glass surface on which the sample is placed.

When the incident angle φ=φH (when the incident angle φ is larger), the moving amount of the light beam becomes greater, and the focus precision becomes higher (about 50 nm/px). However, the focus range (the range for the autofocus in the Z direction) becomes narrower as the moving amount of the light beam increases. On the other hand, when the incident angle φ=φL (when the incident angle is smaller), the moving amount of the light beam becomes smaller, and the precision becomes lower (about 760 nm/px). However, the focus range (the range for the autofocus in the Z direction) becomes wider.

(Autofocus Process)

In the first embodiment, the autofocus is achieved in wide range and with high precision in the following manner. Firstly, the autofocus process is started by using an incident angle (φ=φL) to perform the autofocus in a wider range at low precision. Then, the incident angle (φ=φH) is used to perform autofocus in a narrow range at high precision. Thereby, the autofocus is performed in a wide range at high precision.

Figure 7:
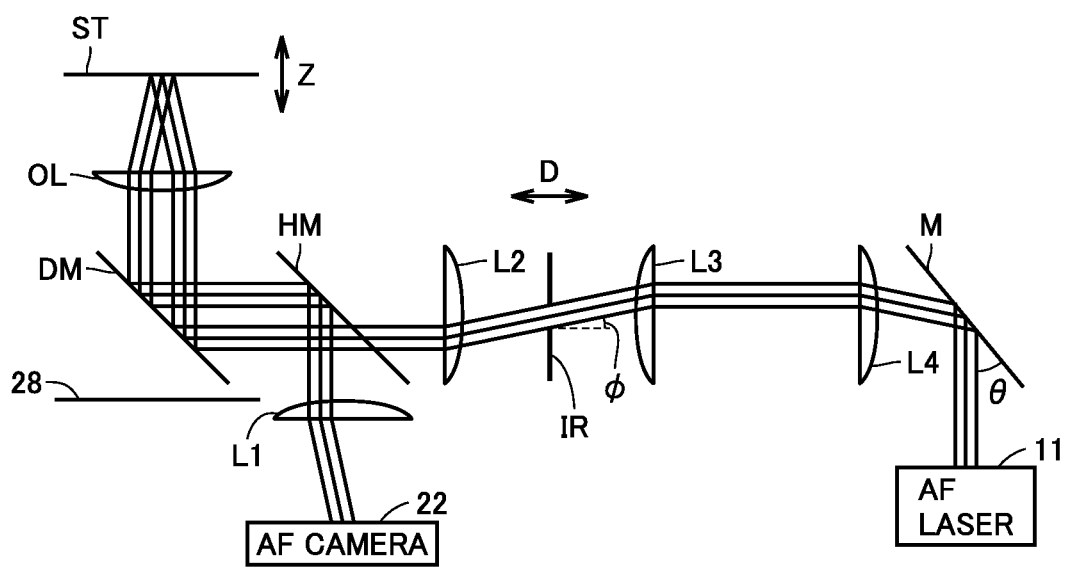
FIG. 7 is a schematic diagram illustrating an optical system in the autofocus device according to the present embodiment.
Figure 8:
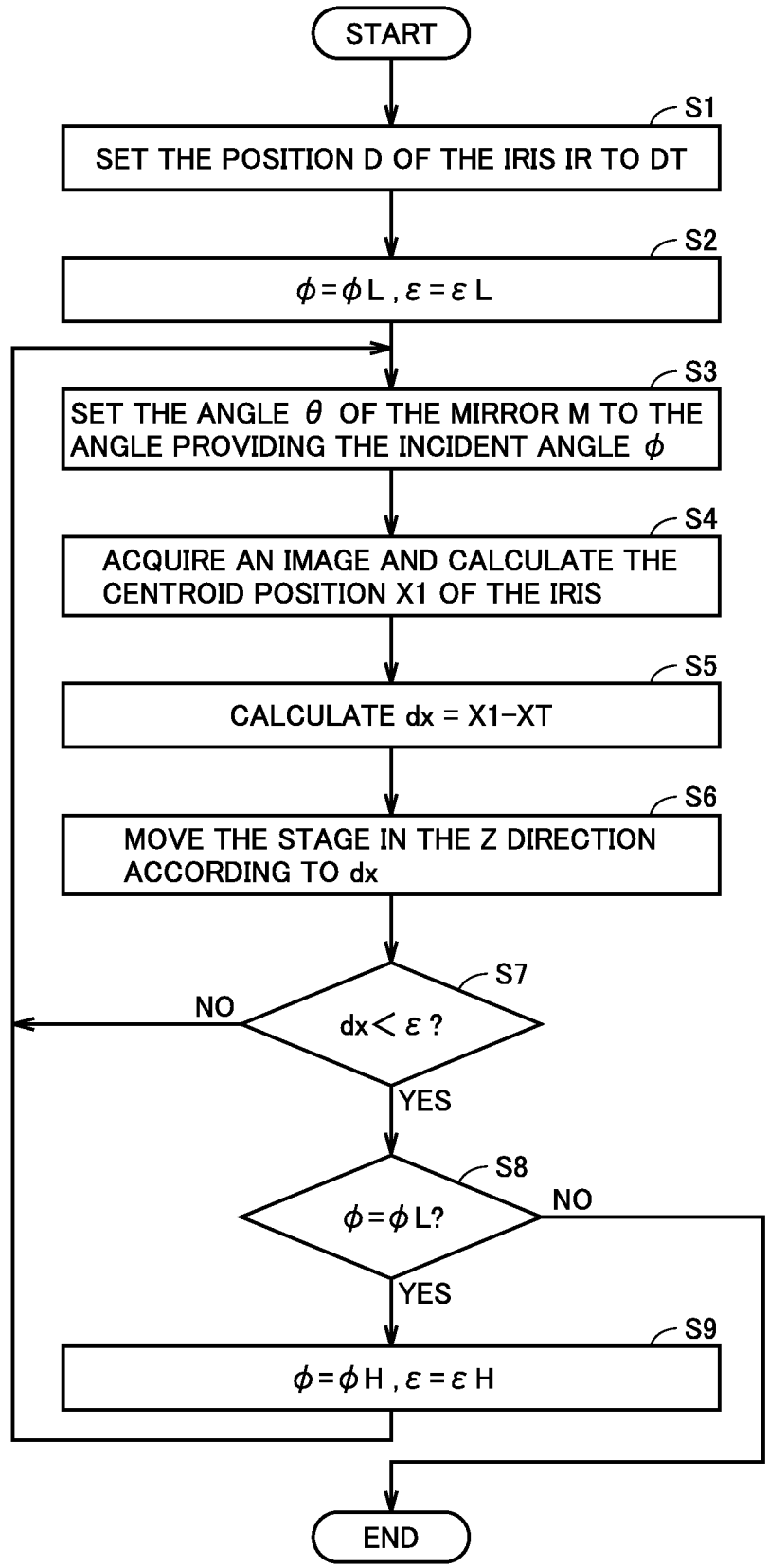
FIG. 8 is a flowchart illustrating an autofocus control according to the first embodiment.

FIG. 7 is a schematic diagram illustrating an optical system in the autofocus device according to the present embodiment. FIG. 8 is a flowchart illustrating an autofocus control according to the first embodiment.

Before the autofocus control, the user should preset a distance between a focus position and the glass surface S. The focus position is linearly related to the position of the iris IR in the optical axis direction, and when the iris IR is positioned at the focus position of the imaging lens L2, the glass surface S is in focus. Therefore, the position of the iris IR may be uniquely set at DT based on the distance from the glass surface S. The other preset parameters include the angle θL of the electric mirror corresponding to the coarse control of the stage, the angle θH of the electric mirror corresponding to the fine control of the stage, and the convergence determination values εL and εH corresponding to the respective focus determination. These parameters are generally constant values determined by the developer of the autofocus device regardless of the user.

In step S1, the control unit 100 sets the position D of the iris IR to a position DT. Then, in step S2, the control unit 100 sets the incident angle φ of the iris IR to a coarse adjustment angle φL, and set the convergence determination value to ε(=εL).

In step S3, the control unit 100 sets the angle θ of the electric mirror M to the incident angle φ(=φL). Then, in step S4, the control unit 100 acquires a reflection image by using the AF camera 22, and calculates the centroid position X1 of the iris IR.

Thereafter, in step S5, the control unit 100 calculates the difference dx (=X1−XT) between the X coordinates of the centroid, and in step S6, the control unit 100 moves the stage ST in the Z direction by an amount corresponding to the difference dx in the Z direction. In step S7, the control unit 100 determines whether or not the difference dx is smaller than the convergence determination value a. If the dx is not smaller than a in step S7 (NO in S7), the operations of steps S3 to S6 are performed again.

If it is determined that the difference dx is smaller than s in step S7 (YES in S7), whether or not the coarse focus adjustment has been performed (whether or not the incident angle φ is equal to φL) is determined in step S8. If it is determined that the coarse focus adjustment has been performed in step S8 (YES in S8), the control unit 100 changes the incident angle to φ=φH and the convergence determination value to ε=εH in step S9, and then performs the high-precision autofocus in steps S3 to S7. In step S8, if it is determined that the operation is not the coarse focus adjustment (φ≠φL), it means that the high-precision autofocus has already been performed (NO in S8), and the control unit 100 ends the autofocus.

According to the present embodiment, by setting the incident angle φ to a non-zero angle, it is possible to immediately determine the moving direction and the moving amount of the stage from the position of the image of the iris IR, and thereby, it is possible to perform the autofocus at high speed.

The autofocus may be performed even if the incident angle φ is fixed, but by setting the incident angle φ of the light beam irradiated on the sample 20 to φL and φH by using the electric mirror M, it is possible to adjust the autofocus precision and the autofocus range. If the incident angle φ of the iris IR is larger, as the glass surface S is being moved in the vertical direction, the centroid of the image of the iris IR on the glass surface S varies greater. As a result, the focus range becomes smaller and it is easier for the image of the iris IR to go beyond the AF camera 22, but the focus precision will become higher since the position of the image varies greater. On the contrary, if the incident angle φ of the iris IR is smaller, the focus range becomes wider, but the focus precision becomes lower. Thus, firstly, the incident angle φ is set smaller so as to perform the autofocus in a wide range, and then the incident angle φ is set larger so as to perform the autofocus with high precision, which makes it possible to achieve the autofocus in a wide range with high precision.

Second Embodiment

In the first embodiment, the autofocus is achieved at a high speed and in a wide range, but the precision is susceptible to the positional deviation of the optical system. Therefore, it is necessary to adjust the offset before or during the observation each time. In the second embodiment, since the light beam is incident from a plurality of directions to perform the autofocus, the precision is unsusceptible to the positional deviation of the optical system, and thereby, the autofocus may be performed stably for a long time.

The autofocus process of the autofocus device according to the present embodiment will be summarized in the following. First, the user determines a focus position distant from the glass surface S. Based on the position determined by the user, the iris IR is moved in the D direction. Then, the angle θ of the electric mirror M is set so as to provide the incident angle φL, and the reflection image of the iris IR is captured by the AF camera 22 so as to determine the centroid position X1. Then, the angle θ of the electric mirror M is set so as to provide an incident angle −φL, the reflection image is captured again so as to determine the centroid position X2. The difference dx between the centroid position X1 and the centroid position X2 is calculated, and the Z stage is moved so that the difference dx becomes zero. The above process is repeated until the difference dx is equal to or less than a predefined value. After the autofocus is completed at the incident angle φL, it is performed at the incident angle φH larger than the incident angle φL in the same manner as described above. According to the present method, the autofocus may be performed with higher precision, wider range and higher speed than the conventional method, and in addition, there is no need to set the target position of the iris in advance.

Figure 9:
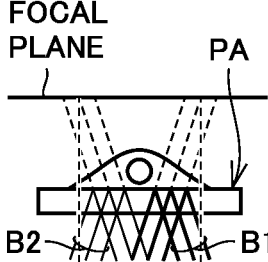
FIG. 9 is a diagram illustrating the principle of autofocus according to a second embodiment.

FIG. 9 is a diagram illustrating the principle of autofocus according to the second embodiment. The laser beam B1 is incident on the sample 20 at an incident angle corresponding to the incident angle φ of the iris IR. The image of the iris IR is observed by the AF camera 22 as the camera image P1. Depending on the Z position of the glass surface S from the focus position, the position of the image of the iris IR is shifted to the left or to the right in the camera image.

By changing the angle of the electric mirror M, the laser beam B2 is incident on the sample at an incident angle −φ from the opposite direction to the incident angle φ. Similar to the case of the angle φ, as the Z position of the glass surface S from the focus position changes, the image of the iris IR changes, the position of the image of the iris IR changes in the camera image. However, unlike the case of the angle φ, the position of the image of the iris IR is shifted to the opposite direction.

The focus position is reached when the difference dx between the position of the image of the iris IR at the incident angle φ and the position of the image of the iris IR at the incident angle −φ is zero. Since the moving direction and the moving amount of the stage ST which supports the glass surface S may be determined from the difference dx between the position of the image of the iris IR in the camera image P1 and the position of the image of the iris IR in the camera image P2, it is possible to perform the autofocus at high speed.

A sensor such as a split photodiode may be used to replace the AF camera 22. However, since the position of the image of the iris IR is determined from a reflection image, the precision will be reduced.

The image of a sample such as cells to be observed is visible from an aperture of the iris IR. Therefore, the image of the aperture of the iris IR depends on the sample such as cells, and the reflection image of the iris IR is not uniform. Therefore, if the position of the image of the iris IR is determined by using the weighted centroid of a split photodiode, the focus is deviated depending on the image of the sample. In order to solve this problem and improve the precision of autofocus, it is preferable that an image processing (for example, binarization processing or contour extraction processing) is performed to separate the image in such a manner that the image of the aperture is white and the image of the portion shielded by the iris IR is black. This enables highly accurate autofocus independent of the sample.

According to the second embodiment, the image captured at the incident angle φ and the image captured at the incident angle −φ are used to shift the image of the iris IR to the target position XT. By using the image captured at the incident angle φ and the image captured at the incident angle −φ, there is no need for the user to set the target position XT of the image of the iris IR in advance.

According to the second embodiment, the focus precision and the focus range may be adjusted by changing the incident angle φ of the iris IR during the autofocus. Since the adjustment of the focus precision and the focus range has been described above with reference to FIGS. 4 and 5, the description thereof will not be repeated.

Figure 10:
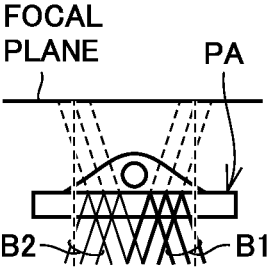
FIG. 10 is a diagram illustrating a modified example in which a slit is used to replace the iris in the second embodiment.
Figure 10:
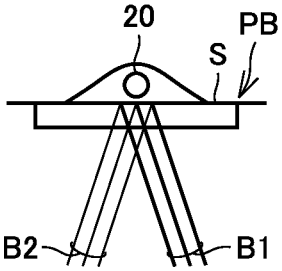
Figure 10:
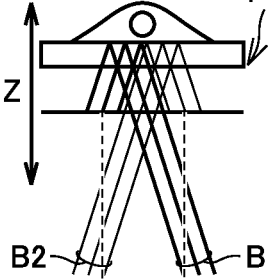
Figure 10:
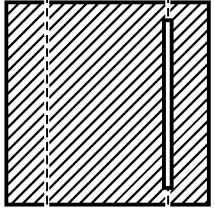
Figure 10:
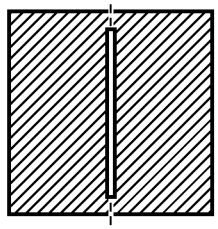
Figure 10:
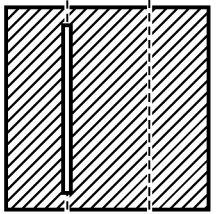
Figure 10:
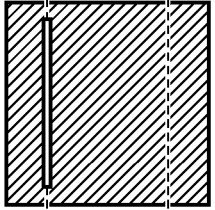
Figure 10:
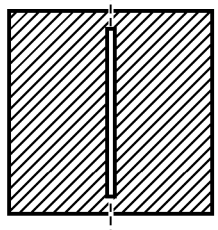
Figure 10:
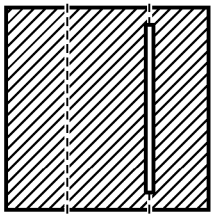

FIG. 10 is a diagram illustrating a modified example in which a slit is used to replace the circular iris in the first embodiment. In the case of FIG. 9, the difference dx is calculated from the weighted centroid position of the image of the iris IR. However, in the case of a slit, the difference dx may be calculated by using the X coordinate of the image directly or X1 and X2 that may be calculated by a simple calculation. The iris IR may have various shapes such as a star shape or a polygonal shape in addition to the circular shape or the slit shape.

(Autofocus Process)

Similar to the first embodiment, it is possible to achieve both wide range and high precision in the second embodiment. Firstly, the autofocus process is started by using an incident angle (φ=φL) to perform the autofocus in a wide range at a low precision. Then, the incident angle (φ=φH) is used to perform the autofocus in a narrow range at a high precision.

According to the second embodiment, in the autofocus performed at the incident angle with a wide range and the autofocus performed at the incident angle with a narrow range, the sample is sequentially irradiated with a laser beam from one direction with an incident angle φ of the iris IR and a laser beam from the other direction with an incident angle −φ to the iris IR and photographed so as to determine the centroid of the image of the iris IR. If only the light beam reflected from the angle φ is used to perform the focus, the position of the stage ST that causes the iris IR and the AF camera conjugate with each other is unknown. Therefore, it is necessary to set in advance the centroid position of the iris IR so that the iris IR is conjugate with the AF camera. However, according to the method of calculating the difference between the positions at the angles φ and −φ, since the difference is zero when the iris IR is conjugate with the AF camera, it is not necessary to set the target position in advance.

Figure 11:
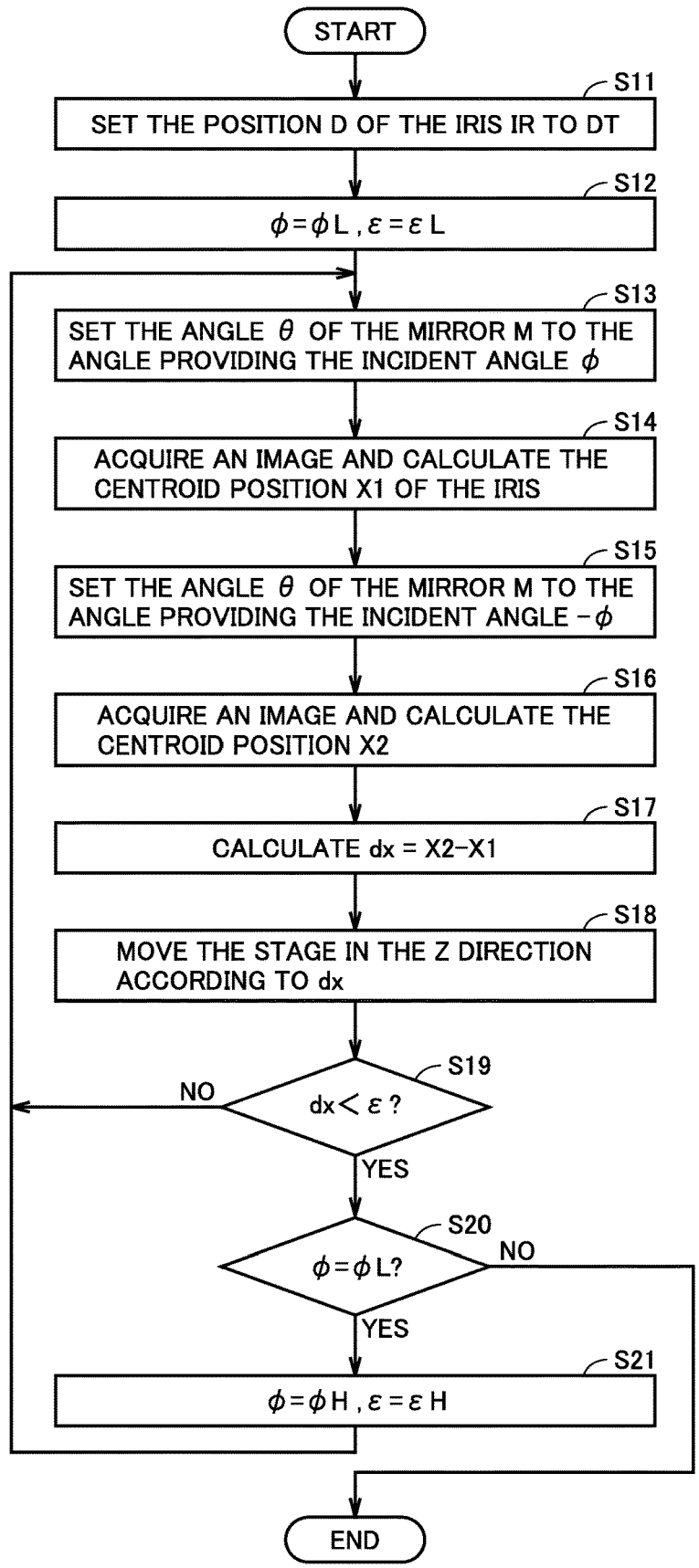
FIG. 11 is a flowchart illustrating an autofocus control according to the second embodiment.

FIG. 11 is a flowchart illustrating an autofocus control according to the second embodiment. Similar to the first embodiment, in the second embodiment, the position DT of the iris IR is determined according to the distance between the focus position and the glass surface S, and the angle θL of the electric mirror corresponding to the coarse stage control and the angle θH of the electric mirror corresponding to the fine stage control are determined, and the convergence determination values εL and εH for determining the focus are determined in advance.

In step S11, the control unit 100 sets the position D of the iris IR to DT. Then, in step S12, the control unit 100 sets the incident angle φ of the iris IR to a coarse adjustment angle φL, and set the convergence determination value ε to εL.

In step S13, the control unit 100 sets the angle θ of the electric mirror M to the incident angle φ(=φL). Then, in step S14, the control unit 100 acquires a reflection image by using the AF camera 22, and calculates the centroid position X1 of the iris IR.

Thereafter, in step S15, the control unit 100 changes the angle θ of the electric mirror M to the incident angle −φ(=−φL), acquires a reflection image in step S16, and calculates the centroid position X2 of the iris IR.

Next, in step S17, the control unit 100 calculates the difference dx (=X1−X2) between the X coordinates of the centroid, and in step S18, the control unit 100 moves the stage ST in the Z direction by an amount corresponding to the difference dx in the Z direction. In step S19, the control unit 100 determines whether or not the difference dx is smaller than the convergence determination value s. If the difference dx is not smaller than a in step S19 (NO in S19), the operations of steps S13 to S18 are performed again.

If it is determined that the difference dx is smaller than e in step S19 (YES in step S19), whether or not the coarse focus adjustment has been performed is determined in step S20. If it is determined that the coarse focus adjustment has been performed in step S20 (YES in S20), the control unit 100 changes the incident angle to φ=φH and the convergence determination value to ε=εH in step S21, and then performs the high-precision autofocus in steps S13 to S18. In step S20, if it is determined that the operation is not the coarse focus adjustment (4, 4L), it means that the high-precision autofocus has already been performed (NO in S20), and the control unit 100 ends the autofocus.

One of the advantages of the autofocus device according to the second embodiment is that the focus position of the iris IR may be determined without setting the target position XT in advance. If only the light beam reflected from the angle φ is used to perform the focus, the position of the stage ST that causes the iris IR and the AF camera conjugate with each other is unknown. Therefore, it is necessary to set in advance the centroid position of the iris IR in the camera image so that the iris IR is conjugate with the AF camera. On the contrary, according to the method of calculating the difference between the positions at the angles φ and −φ, since the difference is zero when the iris IR is conjugate with the AF camera, it is not necessary to set the target position XT in advance.

Figure 31:
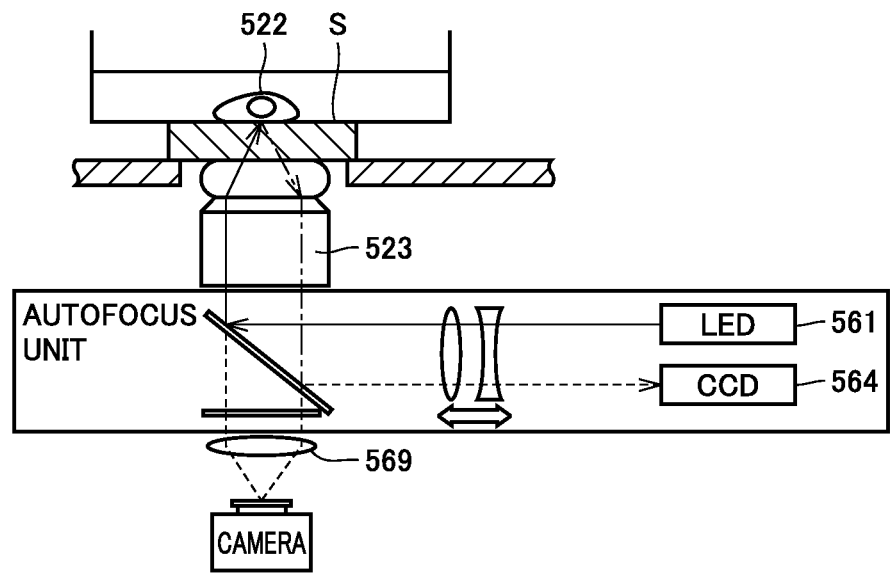
FIG. 31 is a diagram illustrating a second conventional method.

The conventional autofocus method illustrated in FIG. 31 is performed by irradiating the glass surface with a light beam from one direction and detecting a change in the position of the returning light beam. In this method, if the position of the iris or the camera is deviated by ΔX, the focus is deviated by "ΔX/magnification". For example, if the magnification is 100 times and the iris IR is slightly deviated by 100 μm in the X-Y direction (the direction orthogonal to the axis of the magnifying optical system), the focus position may be deviated from the optical axis by 1 μm. In the case of single-molecule imaging, if the focus position is deviated by several hundred nanometers (nm), the obtained image will be greatly blurred. Therefore, in the conventional autofocus, it is necessary to adjust the offset each time, and thus, the automation of observation is difficult.

In the method according to the second embodiment, the iris is imaged from two directions, and the difference between the positions of the iris is detected. Therefore, there is no problem even if the position of the iris IR is deviated in the X-Y direction. Of course, the position of the iris IR may be deviated in the D direction (the optical axis direction), when the position of the iris is deviated by ΔD in the D direction, the focus position is "ΔD/magnification$^2$". For example, if the magnification is 100 times and the position of the iris IR is deviated by 100 μm in the D direction, the deviation of the focus position is only 10 nm (=100 μm/100$^2$). Thus, there is no need to adjust the offset each time, which makes the automation of observation possible.

In the second embodiment, it is described that the focal point is focused on the glass surface S. However, the focal point may be shifted from the glass surface S by changing the position of the iris IR in the D direction. The distance from the glass surface S to the focal plane of the autofocus is in linear relationship with the position of the iris IR in the D direction. Therefore, the focus position may be determined by the distance from the glass surface. It is also possible to adjust the position of the focal plane without changing the position of the iris. In the first embodiment, if the target position XT is shifted, the focus position is changed linearly. In the second embodiment, if the difference dx between the centroids of the two images of the iris is controlled to a non-zero value, the focus position is changed linearly. Further, by changing the position of the iris IR in the X-Y direction (the direction orthogonal to the axis of the magnifying optical system), the light beam emitted in the autofocus may be avoided from being incident on the sample 20.

Also, in the present embodiment, the Z position of the stage is adjusted to perform the focus, but the objective lens or the other lens (arranged in front of the camera or in front of the iris) may be moved to perform the focus.

Further, the autofocus device of the present embodiment may be applied to not only a microscope for research but also a microscope incorporated in industrial equipment.

Third Embodiment

In the first embodiment and the second embodiment, it may be difficult to determine the centroid of the image.

Figure 12:
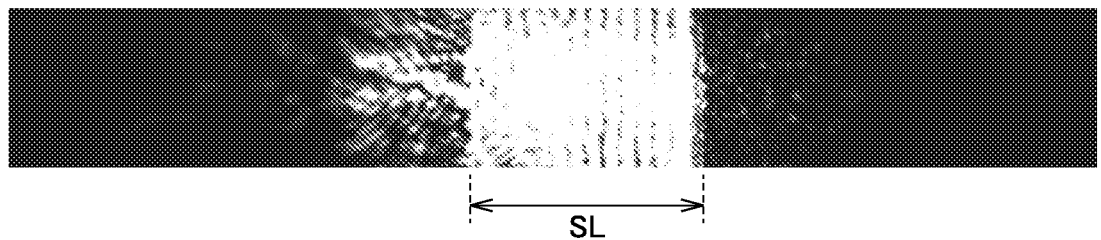
FIG. 12 is an image of a slit captured by an AF camera.

FIG. 12 is an image of a slit captured by the AF camera. The image is an image of one slit SL, but there are many vertical stripes inside the slit SL due to interference. As illustrated in FIG. 12, light is more scattered from the slit SL at the left edge as compared with the right edge, and thus, the reflection image of the slit SL is blurred at the left edge. This phenomenon may occur in the image of the slit SL or the image of the iris IR, which makes it difficult to accurately determine the centroid position of the slit SL or the iris IR by image processing.

In addition, it was found that this phenomenon becomes more significant as the incident angle φ becomes greater, and it is significantly visible only at one edge. It is considered that the reason may be that the light beam incident on the glass surface is scattered for some reason when reflected at the side of the reflected light beam. Therefore, the non-scattering edge may be determined by whether the incident angle φ is positive or negative. Therefore, in the present embodiment, instead of determining the centroid of the image, the edge position of one side of the slit image is detected so as to obtain the information for the autofocus.

Figure 13:
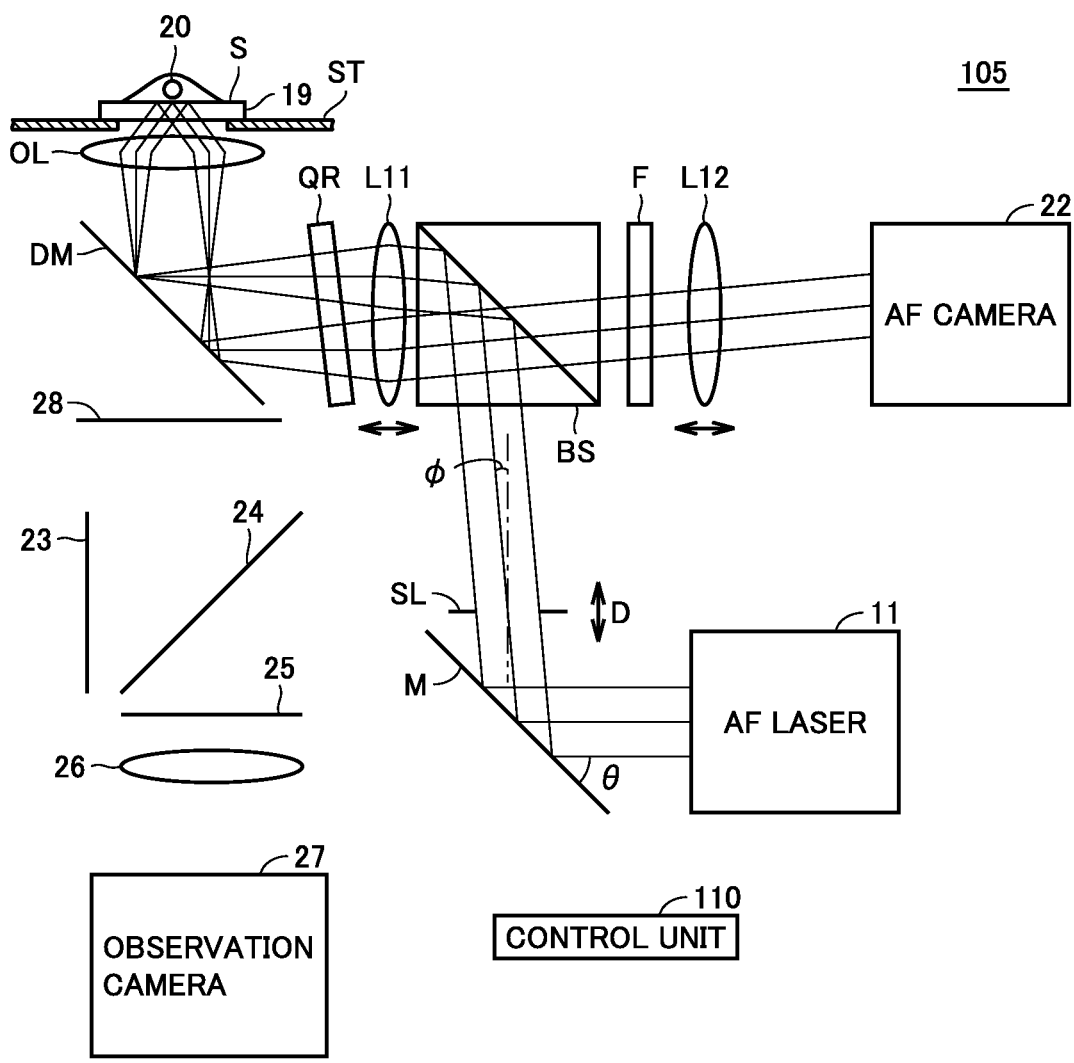
FIG. 13 is a diagram illustrating the configuration of an optical system in a microscope according to a third embodiment.

FIG. 13 is a diagram illustrating the configuration of an optical system in a microscope according to a third embodiment. The microscope 105 illustrated in FIG. 13 includes a stage ST, an autofocus optical system, and an observation optical system.

The autofocus optical system of the microscope 105 includes an AF laser 11 and an electric mirror M which constitute a light source, a slit SL, a polarized beam splitter BS, an imaging lens L11, a lens L12, a quarter wavelength plate QR, a dichroic mirror DM, an objective lens OL, a filter F, and an AF camera 22.

The observation optical system of the microscope 105 includes an excitation filter 23, an observation dichroic mirror 24, an absorption filter 25, an imaging lens 26, and an observation camera 27.

In the auto focus optical system, the laser beam reflected by the electric mirror M is used to obtain the information for focusing the stage ST.

The light beam used in the observation optical system has a wavelength that may pass through the AF dichroic mirror DM. Specifically, the sample 20 is irradiated with a light beam that is emitted from a light source (not shown) and passes through the observation dichroic mirror 24. Then, the observation camera 27 is used to observe the fluorescence light or the reflected light beam.

The microscope 105 further includes a control unit 110 which controls the angle θ of the electric mirror M, the position of the slit SL in the D direction, and the position of the stage ST. The control unit 110 may control the position of one or more of the objective lens OL, the imaging lens L11 and the lens L12 instead of the position of the stage ST.

The laser beam from the AF laser 11 is reflected by the electric mirror M and enters the slit SL. The incident angle φ of the light beam to the slit SL may be controlled by adjusting the angle θ of the electric mirror M. After the light beam passes through the slit SL, it is reflected by the polarized beam splitter BS, passes through the imaging lens L11 and the quarter-wave plate QR, then it is reflected by the dichroic mirror DM, and passes through the objective lens OL to reach the glass surface S of the glass 19 on which the sample 20 is placed. In this way, the slit image is projected on the glass surface S.

The microscope 105 of FIG. 13 is different from the microscope 1 of FIG. 1 in that the laser beam is reflected by the polarized beam splitter BS. The laser beam is polarized when emitted from the AF laser 11, and by adjusting the orientation of the AF laser 11, nearly 100% of the laser beam is reflected by the polarized beam splitter BS. By using the polarized beam splitter BS, the incident laser beam or the reflected light beam may be captured by the AF camera 22 without any loss.

After the light beam reached the surface of the glass 19, it is reflected by the surface of the glass 19. After the reflected light beam passes through the objective lens OL, it is reflected by the dichroic mirror DM, passes through the quarter-wave plate QR, the imaging lens L11, the polarized beam splitter BS, the filter F and the lens L12, and forms an image on the autofocus camera (AF camera) 22. In this way, the image of the slit SL is captured by the AF camera 22.

In the configuration of FIG. 1, if a lens is arranged between the dichroic mirror DM and the half mirror HM, the reflected light beam from the arranged lens may enter the AF camera 22 as noise, and thus, two imaging lenses L1 and L2 are arranged. On the other hand, in the configuration of FIG. 13, since a wave plate QR is provided behind the imaging lens L11, the light beam reflected from the imaging lens L11 is blocked by the polarized beam splitter BS and cannot enter the AF camera 22. Therefore, the imaging lenses L1 and L2 in FIG. 1 may be replaced by one imaging lens L11 so as to reduce the number of lenses to one.

Further, since the quarter-wave plate QR is provided, only the reflected light beam passing through the quarter-wave plate QR may pass through the polarized beam splitter BS and reach the AF camera 22. Without the wave plate QR, the return light from the imaging lens L11 may enter the AF camera 22 as noise. Further, if the quarter wavelength plate QR is not installed at a specific angle, the light beam reflected from the quarter wavelength plate QR may enter the AF camera 22 as noise.

The focus position may be shifted from the glass surface by moving the imaging lens L11 or the lens L12 back and forth. In an actual autofocus module, since the imaging lens L11 is installed inside the microscope and the lens L12 is installed outside the microscope, the offset may be adjusted from the outside. However, if it is possible to control the imaging lens L11 inside the microscope, the lens L12 may be omitted.

The dichroic mirror DM is used to separate the autofocus optical path and the observation optical path. Therefore, it is possible to perform the autofocus while making observation with the microscope 105. The filter F disposed near the lens L12 is configured to filter non-autofocus light from the light beam. Without the filter F, the observation light may enter the AF camera 22, which may affect the autofocus during observation.

Also in the third embodiment, the light beam shaped by the slit SL is irradiated at an angle to the glass surface S mounted on the stage ST which supports the sample 20, and observed at the position of the reflection image.

In FIG. 12, it is described that only the edge at one side is significantly scattered, and it was found that the significantly scattered edge may be changed to the other side depending on whether the incident angle φ is positive or negative. It is considered that the reason may be that the light beam incident on the glass surface is scattered for some reason when reflected at the side of the reflected light beam. Therefore, the non-scattering edge may be determined by whether the incident angle φ is positive or negative.

Figure 14:
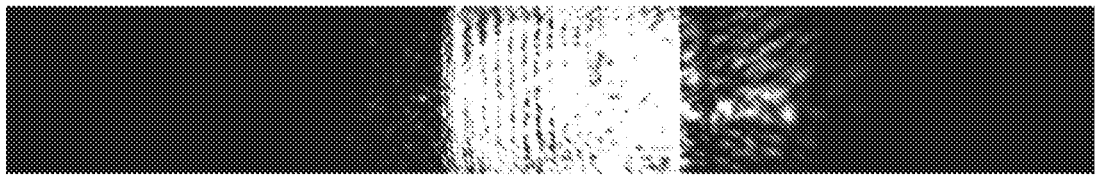
FIG. 14 is an image captured when the incident angle is a positive angle.
Figure 15:
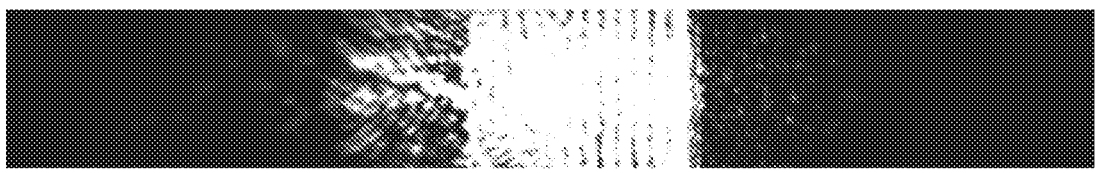
FIG. 15 is an image captured when the incident angle is a negative angle.

FIG. 14 is an image captured when the incident angle is a positive angle. When the incident angle is a positive angle (+φ), the left edge of the two edges is clearly visible. FIG. 15 is an image captured when the incident angle is a negative angle. When the incident angle is a negative angle (−φ), the right edge of the two edges is clearly visible.

Figure 16:
FIG. 16 is a diagram illustrating the detection of edges.
Figure 16:
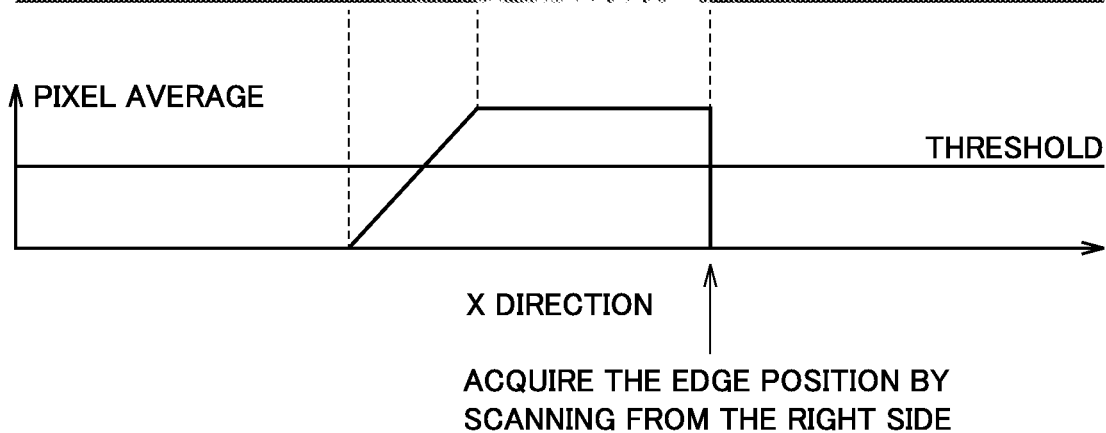

FIG. 16 is a diagram illustrating an edge detection method. For example, as illustrated in FIG. 16, when an image captured by the AF camera 22 is scattered on the left side, the pixels are scanned from the right side of the image, and the position with a brightness greater than a threshold is determined as the edge. If both edges are clearly visible, the centroid may be used. Since one edge is scattered, this method is used.

The edge detection method is also useful when the objective lens is not immersed in water or liquid. In the case of an oil immersed objective lens, the light beam between the solution and the glass surface is reflected. On the other hand, in the case of an objective lens that is not immersed in water or liquid, the light beam is reflected from the lower surface and the upper surface of the glass, and the reflection images overlap each other. By detecting the edge on one side, it is possible to detect only the upper surface of the glass, which makes it possible to perform the autofocus independent of the thickness of the glass.

There are many image processing methods for edge detection, one method will be given below as an example. First, the image is converted into one-dimensional data by averaging the same in the Y direction. In order to detect the left edge, the one-dimensional data is scanned from the left side to search for a position exceeding a predetermined threshold value. In order to detect the right edge, the one-dimensional data is scanned from the right side to search for a position exceeding the threshold value (see FIG. 16). If no position exceeding the threshold value is detected, the autofocus is failed. Since the image processing method is simple, it may be calculated at high speed.

Another method is to differentiate the one-dimensional data so as to detect the position in the X direction with a maximum slope (as the left edge) or with a minimum slope (as the right edge). In this case, a threshold value is determined in advance, and if all pixels do not exceed the threshold value, the autofocus is failed.

In addition, it is possible to perform highly accurate autofocus by using a phenomenon of switching the clearly visible edge between the left side and the right side by changing the incident angle φ from a positive angle to a negative angle or vise visa.

Figure 17:
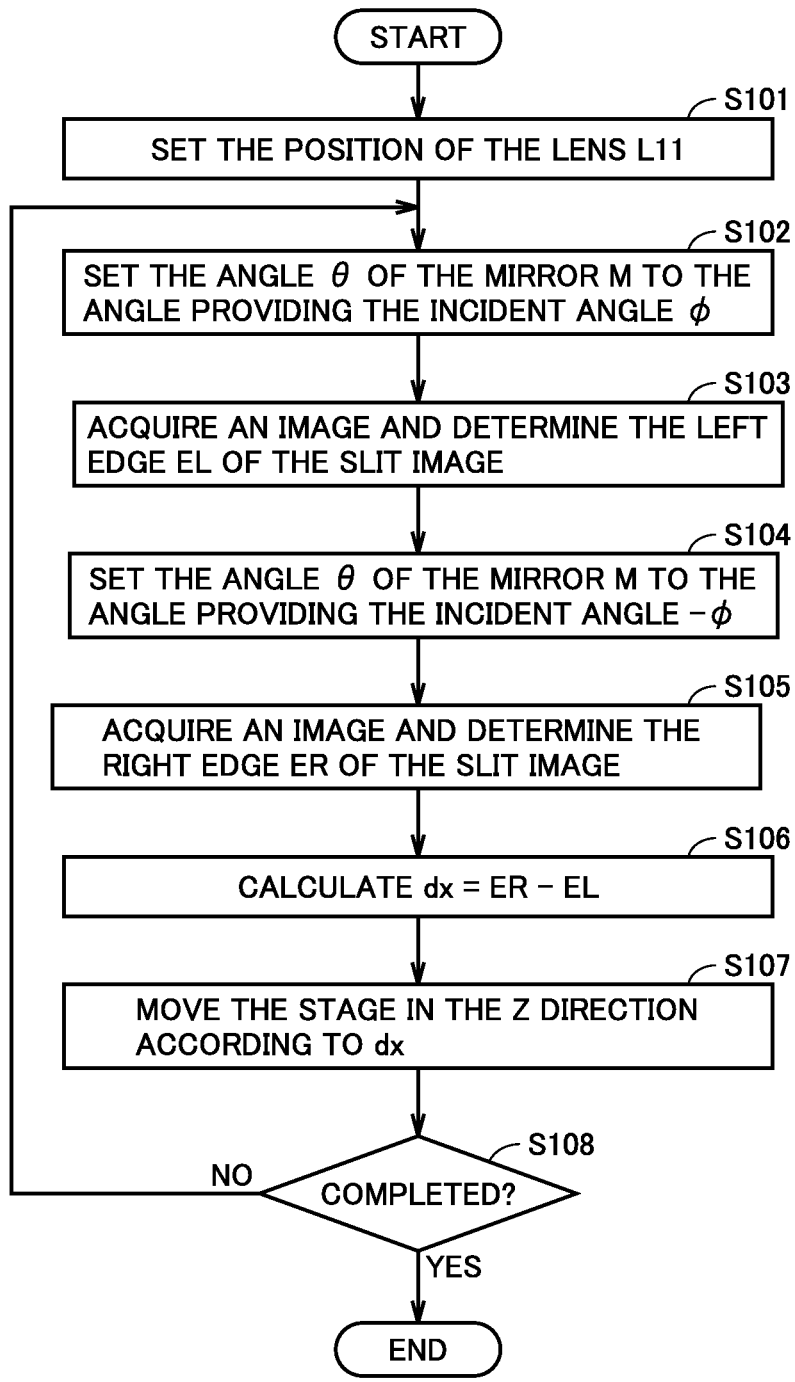
FIG. 17 is a flowchart illustrating an autofocus control according to the third embodiment.

FIG. 17 is a flowchart illustrating an autofocus control according to the third embodiment. Similar to the first embodiment and the second embodiment, in the third embodiment, the position DT of the imaging lens L11 and the angle θ of the electric mirror are determined according to the focus position separated from the glass surface, and the convergence determination value ε for determining the focus is determined in advance. The completion of the autofocus may be determined from the convergence determination value, which makes it possible to prevent the automatic photographing from being started before the autofocus is completed.

In step S101, the control unit 110 sets the position D of the imaging lens L11 to DT, sets the incident angle φ to the slit SL, and sets the convergence determination value to ε.

In step S102, the control unit 110 sets the angle θ of the electric mirror M to an angle that provides the incident angle φ. Then, in step S103, the control unit 110 acquires a reflection image by using the AF camera 22, and detects the left edge EL of the slit SL.

Thereafter, the control unit 110 changes the angle θ of the electric mirror M to an angle that provides the incident angle −φ in step S104, and acquires a reflection image and calculates the right edge ER of the slit SL in step S105.

Next, the control unit 110 calculates an amount obtained by adding an offset to the edge coordinate difference dx (=ER−EL) in step S106, and moves the stage ST to the direction corresponding to the amount by the movement amount corresponding to the amount in the Z direction in step S107. The control unit 110 determines in step S108 whether the difference dx is smaller than the convergence determination value e. Thus, the user or the main program may know whether the difference is smaller than the convergence value. The position of the objective lens OL or the like may be adjusted instead of moving the stage ST.

If the main program issues an end command from in step S108 (YES in S108), the control unit 110 ends the autofocus.

The autofocus device of the third embodiment has the same effect as the autofocus device of the second embodiment. In addition, the autofocus device of the third embodiment can further improve the precision of autofocus. The sample sequentially irradiated with a laser beam from one direction with an incident angle φ toward the slit SL and a laser beam from the other direction with an incident angle −φ toward the slit SL and photographed so as to determine the edges of the image of the slit SL corresponding to the positive incident angle and the negative incident angle, respectively. Then, the difference between the edge positions is calculated, and the vertical position of the glass surface S is controlled so that the difference approaches to the actual slit width. By using this method, the focusing may be performed accurately even if one edge of the image of the iris or the image of the slit SL is scattered.

In the third embodiment, the incident angle φ is variable. However, similar to the first embodiment, the incident angle φ may be set to a fixed non-zero angle so as to match the clear edge only with the target position. In this case, the edge used for focusing is the edge on the side corresponding to the positive or negative sign of the incident angle φ.

Fourth Embodiment

In the first to third embodiments, the autofocus is performed in such a manner that the light beam from the AF light source is incident on the magnifying optical system at a non-zero fixed or variable incident angle φ, and the focus position is adjusted by changing the position of the iris or the slit to be imaged by the AF camera.

However, even if the light beam is not incident on the iris or slit at a non-zero angle, the same effect may be obtained by blocking a part of light after passing through the iris or the slit. In the fourth embodiment, an example in which a part of light after passing through a iris or a slit is blocked will be described.

Figure 18:
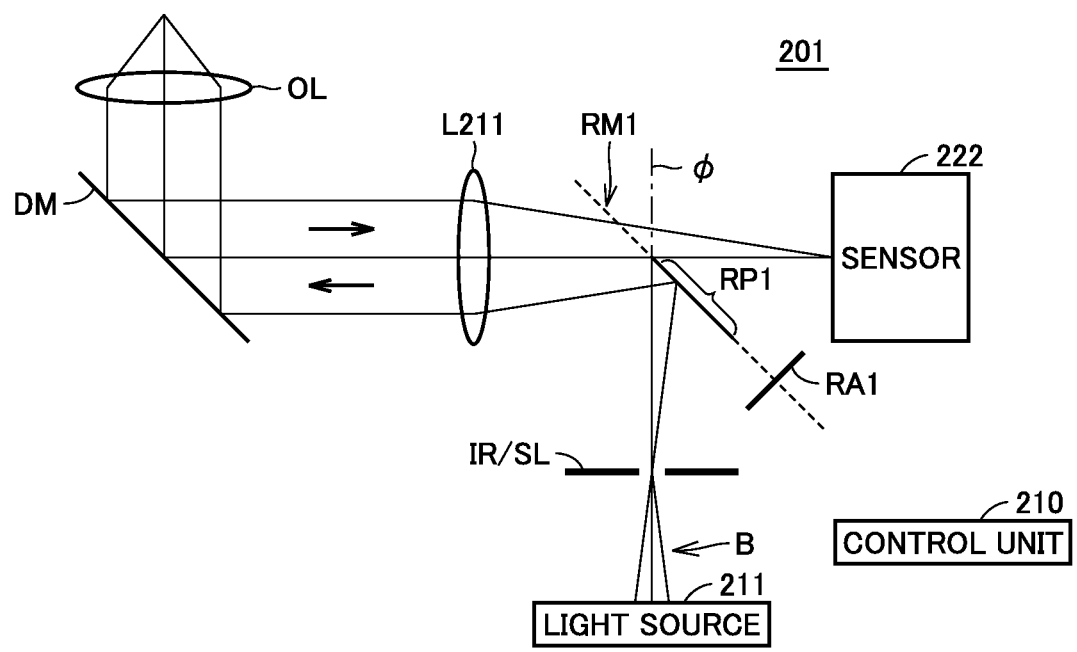
FIG. 18 is a diagram illustrating the configuration of an optical system in a microscope according to a fourth embodiment.

FIG. 18 is a diagram illustrating the configuration of an optical system in a microscope according to a fourth embodiment. The microscope 201 illustrated in FIG. 18 includes a stage, an autofocus optical system, and an observation optical system. The details of the stage and the observation optical system are the same as those in the first to third embodiments, and therefore are not illustrated in FIG. 18. FIG. 18 illustrates only the autofocus optical system.

The autofocus optical system of the microscope 201 includes a light source 211, a slit SL or an iris IR, a rotating mirror RM1, an imaging lens L211, a dichroic mirror DM, an objective lens OL, a sensor 222, and a control unit 210.

As the sensor 222, the AF camera in the first to third embodiments or a split-type light receiving element in which the light receiving surface is divided may be used. In the case of using a split-type light receiving element, the control unit 210 determines a control target value from the light intensity obtained by dividing the image of the shield obtained under the plurality of different conditions into a plurality of sections and integrating the light intensity of each section, and adjusts the position of the stage or the magnifying optical system according to the control target value.

In the autofocus optical system, the light beam emitted from the light source and reflected by the rotating mirror RM1 is used to obtain the information for focusing the stage ST.

Figure 19:
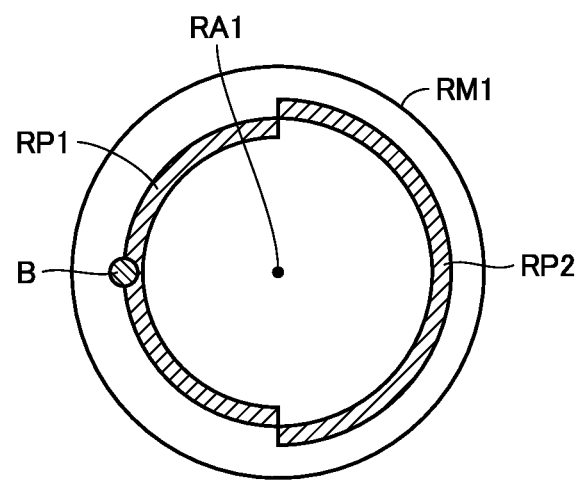
FIG. 19 is a diagram illustrating a positional relationship between a rotating mirror RM1 and a light beam B illustrated in FIG. 18.

FIG. 19 is a diagram illustrating a positional relationship between the rotating mirror RM1 and the light beam B in FIG. 18. With reference to FIGS. 18 and 19, the rotating mirror RM1 is configured to rotate about a rotation axis RA1. The rotating mirror RM1 includes, for example, patterns RP1 and RP2 formed by vapor deposition of aluminum on a transparent glass disk. The pattern RP1 is configured to reflect the light beam that has passed through the slit SL or the iris IR in a different manner, and the pattern RP2 is configured to reflect the light beam in a manner different from the pattern RP1. In FIG. 18, for simplification, the light of the left half and the light of the right half relative to the optical axis φ are reflected. If the light passes through the center, the range increases but the precision decreases. The reflection pattern is designed based on this fact.

The light source 211 may not be a light source with high linearity such as a laser. For example, it may be an LED or a mercury lamp. Therefore, the light beam from the light source 211 may enter the iris IR or the slit SL from any direction.

In the example of FIG. 19, after the light beam B passes through the iris IR, it hits the pattern RP1 of the rotating mirror RM1, and only a half of the light beam B is reflected toward the imaging lens L211. The light beam passed through the imaging lens L211 is reflected by the dichroic mirror DM, passes through the objective lens OL, hits the glass surface and is reflected by the glass surface. The reflected light beam passes through the objective lens OL, reflected by the dichroic mirror DM, passes through the imaging lens, and reaches the sensor 222.

Figure 20:
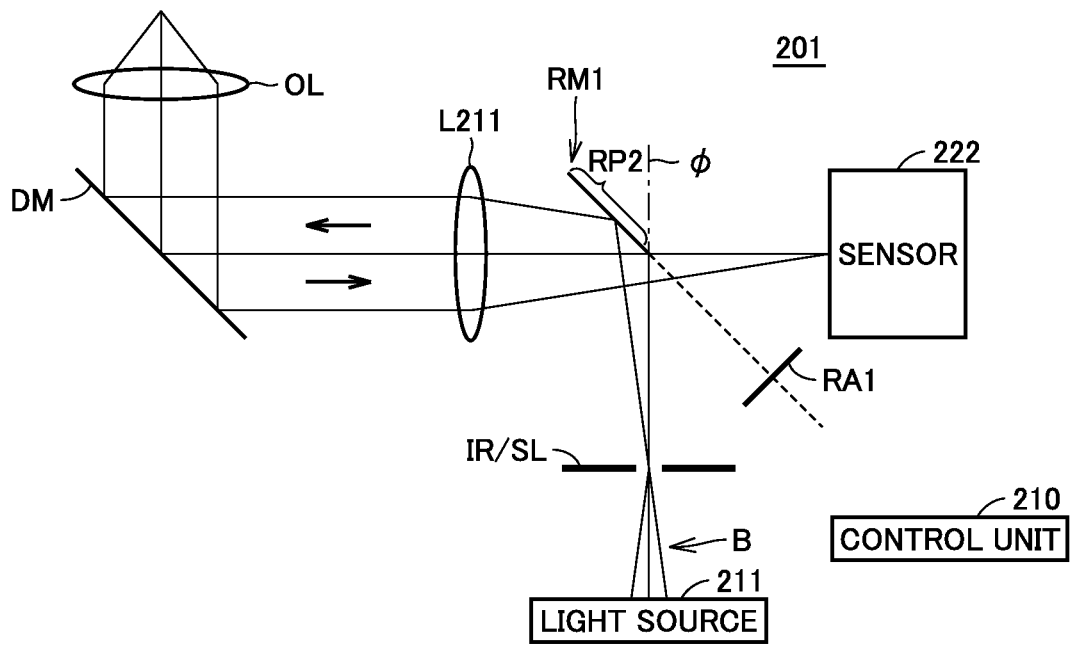
FIG. 20 is a diagram illustrating a state in which the rotating mirror RM1 is rotated by 180° in the microscope 201 illustrated in FIG. 18.
Figure 21:
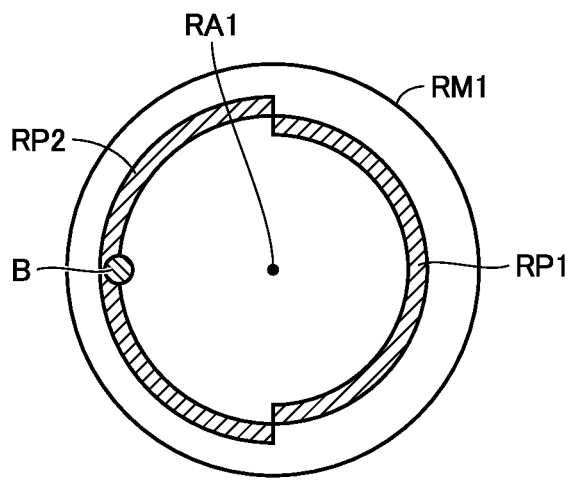
FIG. 21 is a diagram illustrating a positional relationship between the rotating mirror RM1 and a light beam B illustrated in FIG. 20.

FIG. 20 is a diagram illustrating a state in which the rotating mirror RM1 is rotated by 180° in the microscope 201 illustrated in FIG. 18. FIG. 21 is a diagram illustrating a positional relationship between the rotating mirror RM1 and the light beam B illustrated in FIG. 20.

With reference to FIGS. 20 and 21, as the rotating mirror RM1 is rotated by 180°, a half of the light beam which is opposite to that in the example of FIG. 18 reaches the imaging lens L211. Therefore, if the focus is not achieved, the light-receiving position of the sensor 222 is deviated in the opposite direction to the case of FIG. 18. If the image obtained in the state illustrated in FIG. 18 and the image obtained in the state illustrated in FIG. 20 do not match each other, it is determined that the image is out of focus. If the image obtained in the state illustrated in FIG. 18 and the image obtained in the state illustrated in FIG. 20 match each other, it is determined that the image is in focus. A split-type light receiving element may be used to compare the positions of the light in the sensor 222.

In the fourth embodiment, the rotating mirror RM1 is rotated to alternately change the microscope 201 between the state illustrated in FIG. 18 and the state illustrated in FIG. 20 so as to obtain two images.

As mentioned above, the control unit 210 causes the light beam to enter two opposite positions relative to the optical axis of the objective lens OL, and acquires an image corresponding to each light beam. By comparing the obtained images, it is possible to achieve the autofocus with improved precision. According to this method, even if the image position of the iris IR or the slit SL on the sensor is deviated due to the distortion of the optical system, it is possible to achieve the autofocus.

Fifth Embodiment

In the fourth embodiment, a part of the light beam passing through the iris or the slit is reflected by the mirror toward the objective lens. However, the focus may be achieved by blocking a part of the light beam with a mask instead of reflecting a part of the light beam with a mirror.

Figure 22:
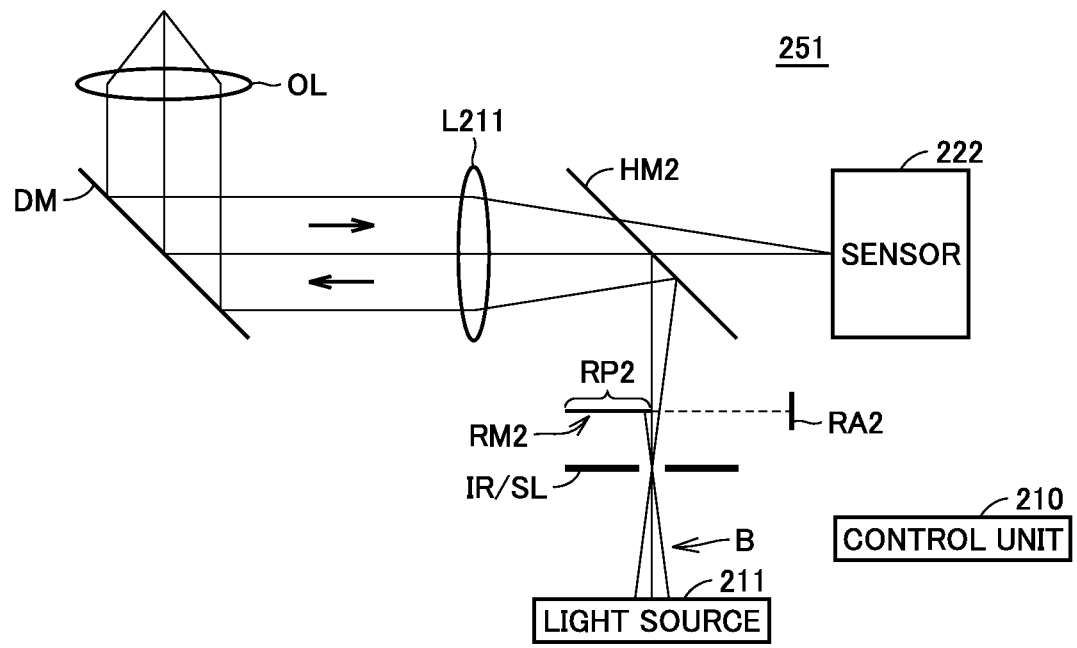
FIG. 22 is a diagram illustrating the configuration of an optical system in a microscope according to a fifth embodiment.

FIG. 22 is a diagram illustrating the configuration of an optical system in a microscope according to a fifth embodiment. The microscope 251 illustrated in FIG. 22 includes a stage, an autofocus optical system, and an observation optical system. The details of the stage and the observation optical system are the same as those in the first to third embodiments, and therefore are not illustrated in FIG. 22. FIG. 22 illustrates only the autofocus optical system.

The autofocus optical system of the microscope 251 includes a light source 211, a slit SL or an iris IR, a rotating mask RM2, a half mirror HM2, an imaging lens L211, a dichroic mirror DM, an objective lens OL, a sensor 222, and a control unit 210.

Similar to the fourth embodiment, an AF camera or a split-type light receiving element may be used as the sensor 222.

In the autofocus optical system, the light beam passed through the rotating mask RM2 is used to obtain the information for focusing the stage ST.

Figure 23:
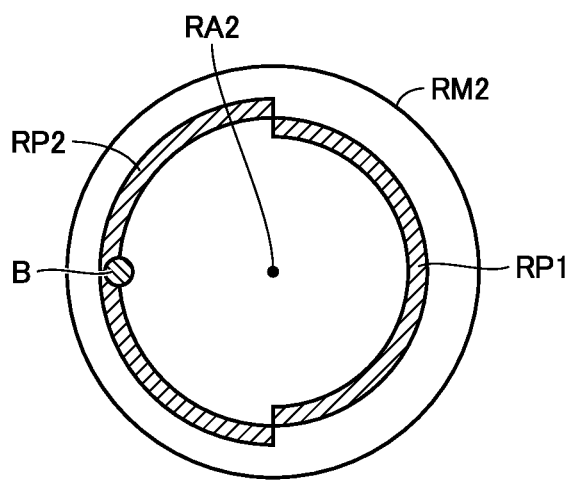
FIG. 23 is a diagram illustrating a positional relationship between a rotating mask RM2 and a light beam B illustrated in FIG. 22.

FIG. 23 is a diagram illustrating a positional relationship between the rotating mask RM2 and the light beam B illustrated in FIG. 22. With reference to FIGS. 22 and 23, the rotating mask RM2 is configured to rotate about a rotation axis RA2. The rotating mask RM2 includes, for example, patterns RP1 and RP2 formed by vapor deposition of aluminum on a transparent glass disk. The patterns RP1 and RP2 are configured to block the light beam passing through the slit SL or the iris IR in different patterns. In FIG. 23, a half of the light beam is blocked. The pattern RP1 or RP2 may be configured to reflect the light beam toward the light source like a mirror as long as it is capable of blocking a part of the light beam.

Similar to the fourth embodiment, the light source 211 may not be a light source with high linearity such as a laser. Therefore, the light beam from the light source 211 may enter the iris IR or the slit SL from any direction.

In the example of FIG. 22, after the light beam B passes through the iris IR, it hits the pattern RP2 of the rotating mask RM2. A half of the light beam B is blocked, and the other half is reflected by the half mirror HM2 toward the imaging lens L211. The light beam passed through the imaging lens L211 is reflected by the dichroic mirror DM, passes through the objective lens OL, hits the glass surface and is reflected by the glass surface. The reflected light beam passes through the objective lens OL, reflected by the dichroic mirror DM, passes through the imaging lens L211, and reaches the sensor 222.

Figure 24:
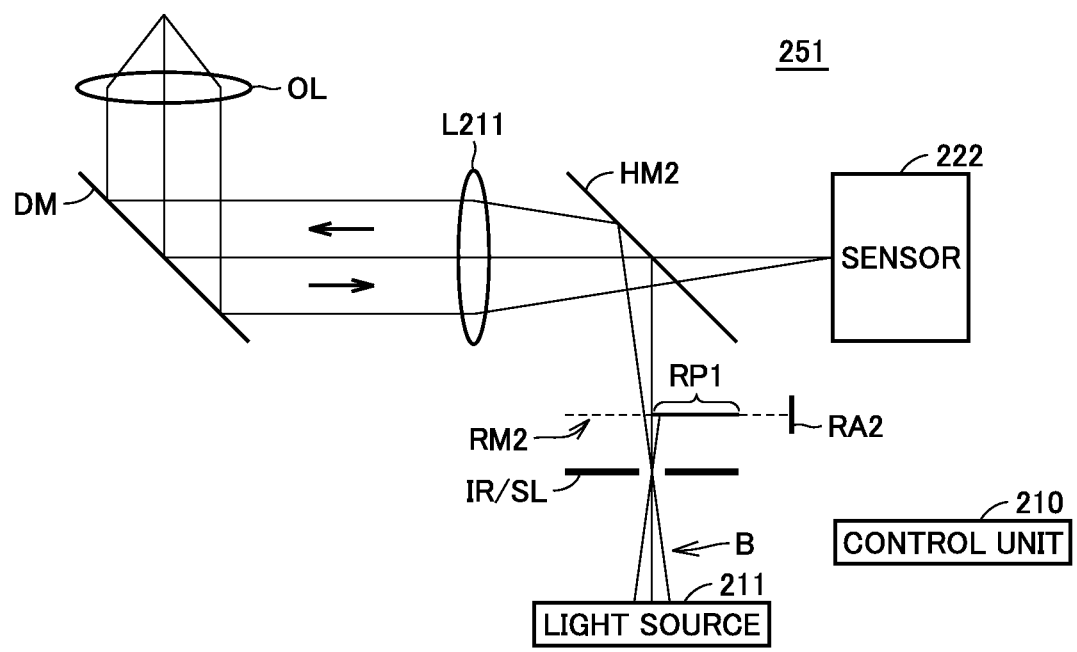
FIG. 24 is a diagram illustrating a state in which the rotating mask RM2 is rotated by 180° in the microscope 251 illustrated in FIG. 22.
Figure 25:
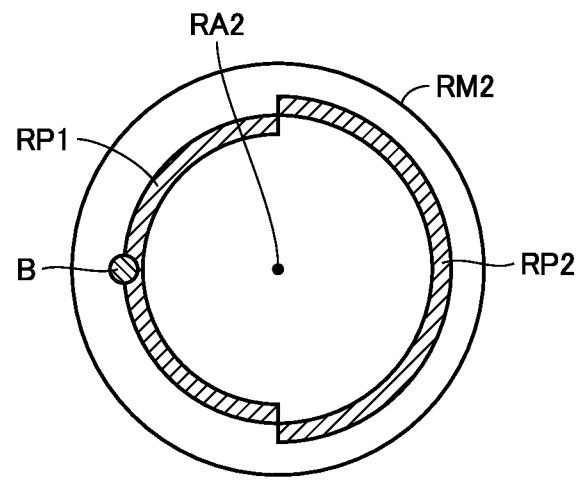
FIG. 25 is a diagram illustrating a positional relationship between the rotating mask RM2 and the light beam B illustrated in FIG. 24.

FIG. 24 is a diagram illustrating a state in which the rotating mask RM2 is rotated by 180° in the microscope 251 illustrated in FIG. 22. FIG. 25 is a diagram illustrating a positional relationship between the rotating mask RM2 and the light beam B illustrated in FIG. 24.

With reference to FIGS. 24 and 25, as the rotating mask RM2 is rotated by 180°, a half of the light beam which is opposite to that in the example of FIG. 22 reaches the imaging lens L211. Therefore, if the focus is not achieved, the light-receiving position of the sensor 222 is deviated in the opposite direction to the case of FIG. 22. If the image obtained in the state illustrated in FIG. 22 and the image obtained in the state illustrated in FIG. 24 do not match each other, it is determined that the image is out of focus. If the image obtained in the state illustrated in FIG. 22 and the image obtained in the state illustrated in FIG. 24 match each other, it is determined that the image is in focus. A split-type light receiving element may be used to compare the positions of the light in the sensor 222.

In the fifth embodiment, the rotating mask RM2 is rotated to alternately change the microscope 251 between the state illustrated in FIG. 22 and the state illustrated in FIG. 24 so as to obtain two images. Instead of the rotating mask, an element such as a liquid crystal that electrically controls light transmission may be used as a mask to obtain the images in the similar manner.

In the fifth embodiment, the pattern of the mask is formed into a plurality of patterns so that the transmitted light beam is asymmetric relative to the optical axis of the magnifying optical system, and the light beam is incident on the objective lens, and the reflected light beam is observed. Therefore, it is possible to achieve the autofocus with the same precision as the first to fourth embodiments.

Sixth Embodiment

The microscope according to a sixth embodiment is similar to the microscope according to the fifth embodiment in that a mask is used, but different in that two imaging lenses are required and a half mirror is provided in front of the two imaging lenses.

Figure 26:
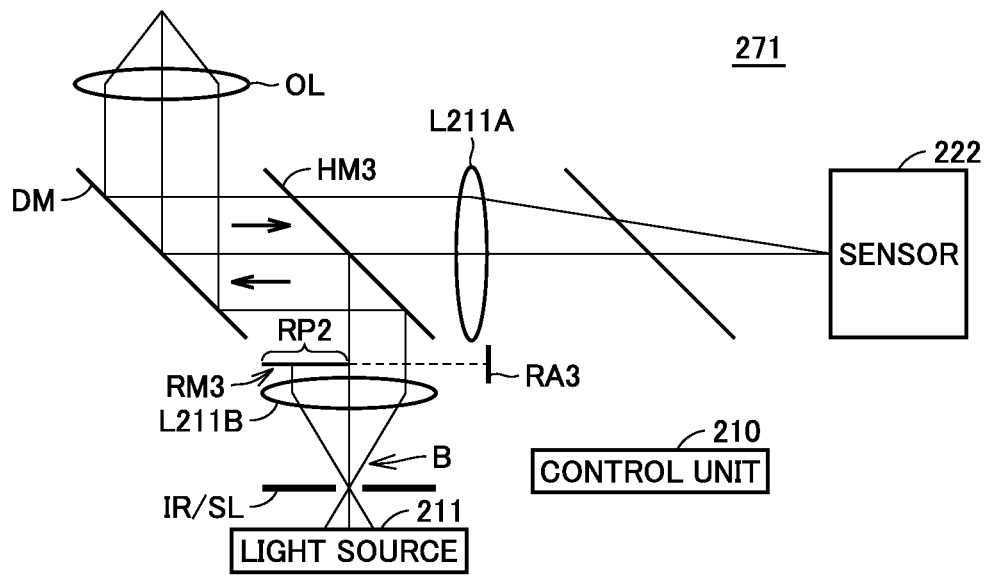
FIG. 26 is a diagram illustrating the configuration of an optical system in a microscope according to a sixth embodiment.

FIG. 26 is a diagram illustrating the configuration of an optical system in a microscope according to a sixth embodiment. The microscope 271 illustrated in FIG. 26 includes a stage, an autofocus optical system, and an observation optical system. The details of the stage and the observation optical system are the same as those in the first to third embodiments, and therefore are not illustrated in FIG. 26. FIG. 26 illustrates only the autofocus optical system.

The autofocus optical system of the microscope 271 includes a light source 211, a slit SL or an iris IR, an imaging lens L211A, an imaging lens L211B, a rotating mask RM3, a half mirror HM3, a dichroic mirror DM, an objective lens OL, a sensor 222, and a control unit 210.

Similar to the fourth embodiment, an AF camera or a split-type light receiving element may be used as the sensor 222.

In the autofocus optical system, the light beam passed through the rotating mask RM3 is used to obtain the information for focusing the stage ST.

Figure 27:
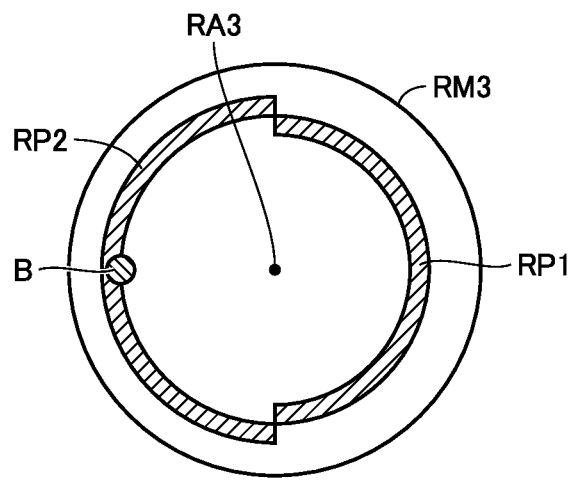
FIG. 27 is a diagram illustrating a positional relationship between the rotating mask RM3 in FIG. 26 and the light beam B.

FIG. 27 is a diagram illustrating a positional relationship between the rotating mask RM3 and the light beam B illustrated in FIG. 26. With reference to FIGS. 26 and 27, the rotating mask RM3 is configured to rotate about a rotation axis RA3. The rotating mask RM3 includes, for example, patterns RP1 and RP2 formed by vapor deposition of aluminum on a transparent glass disk. The patterns RP1 and RP2 are configured to block the light beam passing through the slit SL or the iris IR in different patterns. The pattern RP1 or RP2 may be configured to reflect the light beam toward the light source like a mirror as long as it is capable of blocking a part of the light beam.

Similar to the fourth and fifth embodiments, the light source 211 may not be a laser, it may be a light source which radiates a light beam with a certain degree of linearity such as an LED. Therefore, the light beam from the light source 211 may enter the iris IR or the slit SL from any direction.

After the light beam B passes through the iris IR, it reaches the imaging lens L211B. As illustrated in FIG. 26, after the light beam passes through the imaging lens L211B, it reaches the rotating mask RM3. A half of the light beam B is blocked by the pattern RP2, and the other half is reflected by the half mirror HM3. The light reflected by the half mirror HM3 is reflected by the dichroic mirror DM, passes through the objective lens OL, reaches the glass surface and is reflected by the glass surface. The reflected light beam passes through the objective lens OL, reflected by the dichroic mirror DM, passes through the imaging lens L211A, and reaches the sensor 222.

Figure 28:
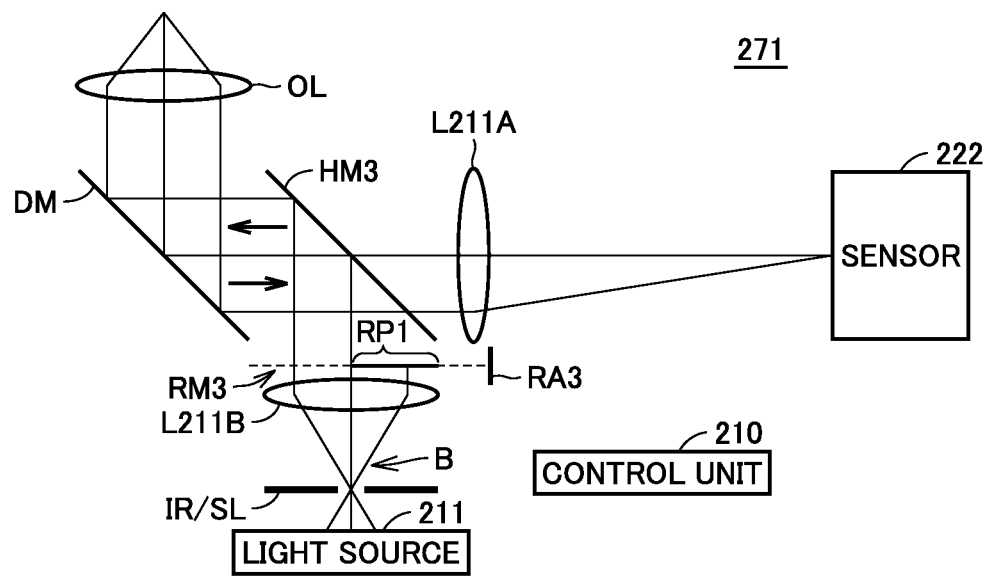
FIG. 28 is a diagram illustrating a state in which a rotating mask RM3 is rotated by 180° in the microscope 271 illustrated in FIG. 26.
Figure 29:
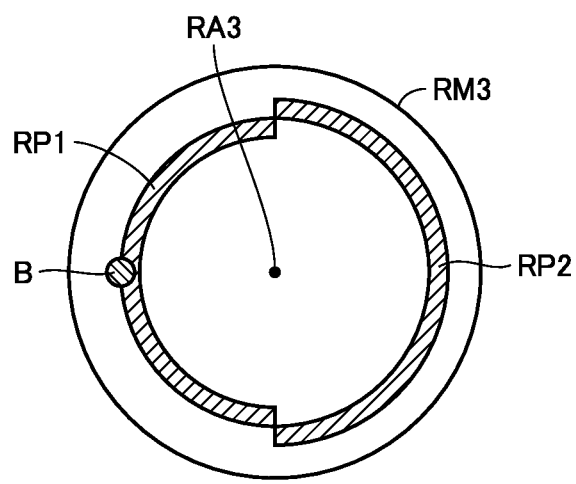
FIG. 29 is a diagram illustrating a positional relationship between the rotating mask RM3 and the light beam B illustrated in FIG. 28.
Figure 30:
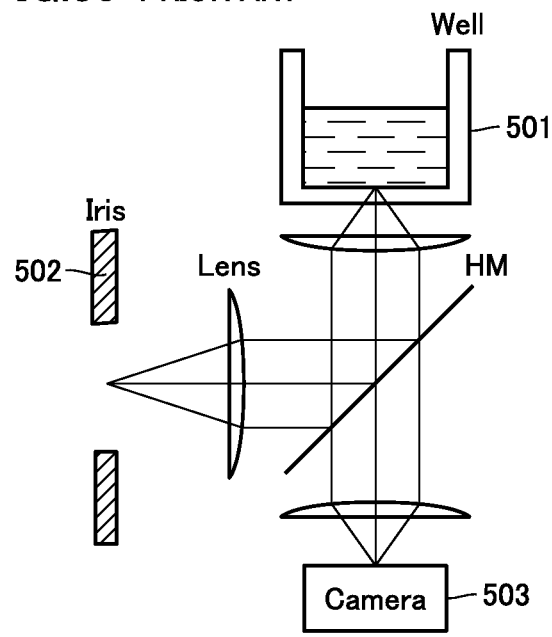
FIG. 30 is a diagram illustrating a first conventional method.

FIG. 28 is a diagram illustrating a state in which the rotating mask RM3 is rotated by 180° in the microscope 271 illustrated in FIG. 26. FIG. 29 is a diagram illustrating a positional relationship between the rotating mask RM3 illustrated in FIG. 28 and the light beam B.

With reference to FIGS. 28 and 29, as the rotating mask RM3 is rotated by 180°, a half of the light beam which is opposite to that in the example of FIG. 26 reaches the imaging lens L211A. Therefore, if the focus is not achieved, the light-receiving position of the sensor 222 is deviated in the opposite direction to the case of FIG. 26. If the image obtained in the state illustrated in FIG. 26 and the image obtained in the state illustrated in FIG. 28 do not match each other, it is determined that the image is out of focus. If the image obtained in the state illustrated in FIG. 26 and the image obtained in the state illustrated in FIG. 28 match each other, it is determined that the image is in focus. A split-type light receiving element may be used to compare the positions of the light in the sensor 222.

In the sixth embodiment, the rotating mask RM3 is rotated to alternately change the microscope 271 between the state illustrated in FIG. 26 and the state illustrated in FIG. 28 so as to obtain two images. Instead of the rotating mask, an element such as a liquid crystal that electrically controls light transmission may be used as a mask to obtain the images in the similar manner.

In the sixth embodiment, the pattern of the mask is formed into a plurality of patterns so that the transmitted light beam is asymmetric relative to the optical axis of the magnifying optical system, and the light beam is incident on the objective lens, and the reflected light beam is observed. Therefore, it is possible to achieve the autofocus with the same precision as the first to fifth embodiments.

SUMMARY

Finally, the first to sixth embodiments described above will be summarized below with reference to the drawings.

According to one aspect, the present disclosure provides an autofocus device used in an optical apparatus equipped with a stage (ST) that supports a transparent member (19) on which an observation object (20) is placed, and a magnifying optical system (L1, L2, HM, DM, OL) which is used to observe the observation object. The autofocus device includes: a light source device (11, M, 13, 211) which emits an outgoing light beam to the observation object via the magnifying optical system; a shield (IR, SL) which is arranged at a position opposite to the observation object relative to the magnifying optical system and configured to limit the light beam emitted from the light source device; a light detection unit (22, 222) which receives, via the magnifying optical system, a reflected light beam which is reflected from a reflection surface of the transparent member after the outgoing light beam reaches the reflection surface via the shield and the magnifying optical system; and a control unit (100, 110, 210) which controls the position of the stage or the magnifying optical system. As illustrated in FIG. 3, FIG. 4, FIG. 9, FIG. 10, and FIGS. 18 to 29, the control unit adjusts the position of the stage or the magnifying optical system based on a reflected light beam from the shield which is obtained by irradiating the observation object with the light beam which is emitted from the light source device and limited by the shield under a plurality of different conditions.

Preferably, as illustrated in FIGS. 3, 4, 9, and 10, the light source device is configured to adjust an angle of the outgoing light beam relative to the shield.

Preferably, as illustrated in FIGS. 18 to 21, the autofocus device further includes an optical element (RM1) which reflects a part of the light beam emitted from the light source device and limited by the shield. The light beam emitted from the light source device and reflected by the optical element is incident on the observation object.

Preferably, as illustrated in FIGS. 22 to 29, the autofocus device further includes an optical element (RM2, RM3) which blocks, attenuates or reflects a part of the light beam emitted from the light source device and limited by the shield. A part of the light beam which is emitted from the light source device and is not blocked, attenuated and reflected by the optical element is incident on the observation object.

More preferably, the control unit (210) determines a control target value from the position of a reflection image of the shield obtained under the plurality of different conditions, and adjusts the position of the stage or the magnifying optical system accordingly.

More preferably, the control unit (210) determines a control target value by dividing the image of the shield obtained under the plurality of different conditions into a plurality of sections and integrating the light intensity of each section, and adjusts the position of the stage or the magnifying optical system accordingly.

According to another aspect, the present disclosure provides an autofocus device used in an optical apparatus equipped with a stage (ST) that supports a transparent member (19) on which an observation object (20) is placed, and a magnifying optical system (L1, L2, HM, DM, OL)

which is used to observe the observation object. The autofocus device includes: a light source device (11, M, 13, 211) which emits an outgoing light beam to the observation object via the magnifying optical system; a shield (IR) which is arranged at a position opposite to the observation object relative to the magnifying optical system and configured to limit the light beam emitted from the light source device; an imaging unit (22) which receives, via the magnifying optical system, a reflected light beam which is reflected from a reflection surface of the transparent member after the outgoing light beam reaches the reflection surface via the shield and the magnifying optical system; and a control unit (100) which controls the position of the stage or the magnifying optical system. The light source device emits the outgoing light beam at a non-zero angle ($\phi$) relative to the axis of the magnifying optical system. As illustrated in FIGS. 3 and 4, the control unit (100) adjusts the position of the stage or the magnifying optical system so as to match the position (X1) of an image of the shield captured by the imaging device (22) with a target position (XT).

Thus, by setting the incident angle ($\phi$) to a non-zero angle, it is possible to immediately determine the moving direction and the moving amount of the stage from the position of the image of the iris (IR), and thereby, it is possible to perform the autofocus at high speed.

Preferably, as illustrated in FIG. 3, the control unit (100) adjusts the position of to the stage or the magnifying optical system so as to match the position (X1, X2) of an aperture of the shield in the image of the shield captured by the imaging device (22) with the target position (XT).

Preferably, the control unit (100) performs an image processing on the image captured by the imaging device (22) to separate the outside of the aperture from the inside of the aperture in the image of the shield (IR). This enables accurate autofocus to be performed accurately without being affected by the image of the observation object reflected inside the aperture.

Preferably, the light source device is configured to adjust an angle ($\phi$) of the outgoing light beam relative to the shield (IR), and the control unit (100) is configured to adjust the position of the stage or the magnifying optical system so as to make a difference (dx) between a first position (X1) of an image of the shield (IR) when the outgoing light beam is emitted from the light source device at a first angle ($\phi$) and a second position (X2) of an image of the shield (IR) when the outgoing light beam is emitted from the light source device at a second angle ($-\phi$) different from the first angle equal to a target value (for example, 0). Thereby, it is possible to determine the focus is achieved without setting the target position corresponding to the focal point on the captured image in advance.

Preferably, the light source device is configured to adjust an angle of the outgoing light beam relative to the shield (IR), and the control unit (100) is configured to roughly adjust the position of the stage or the magnifying optical system based on a first position of an image of the shield (IR) when the outgoing light beam is emitted from the light source device at a first angle ($\phi L$), and finely adjust the position of the stage or the magnifying optical system based on a second position of an image of the shield (IR) when the outgoing light beam is emitted from the light source device at a second angle ($\phi H$) larger than the first angle ($\phi L$). Thereby, the autofocus may be achieved in wide range and with high precision.

More preferably, the light source device includes a light source (11) which emits an outgoing light beam with a high linearity and an electric optical element (M) configured to receive a light beam emitted from the light source and adjust an incident angle of the light beam emitted from the light source device toward the shield, and the control unit (100) is configured to adjust the angle ($\theta$) of the electric optical element (M) in the case when the angle ($\phi$) of the light beam emitted from the light source device is equal to the first angle ($\phi$ or $\phi L$) different from the case when the angle ($\phi$) of the light beam emitted from the light source device is equal to the second angle ($\phi$ or $\phi H$).

Preferably, the magnifying optical system includes an objective lens (OL), a half mirror (HM), a light source-side imaging lens (L2) arranged on one optical path of an optical path for a light beam passed through the half mirror (HM) and an optical path for a light beam reflected by the half mirror (HM), and a camera-side imaging lens (L1) arranged on the other optical path of an optical path for a light beam passed through the half mirror (HM) and an optical path for a light beam reflected by the half mirror (HM).

Preferably, the light source device emits a polarized light beam, and the magnifying optical system includes an objective lens (OL), a quarter-wave plate (QR), a polarized beam splitter (BS), and an imaging lens (L11) arranged between the quarter-wave plate (QR) and the polarized beam splitter (BS). With such a configuration, it is possible to reduce the loss of the amount of light from the light source device and reduce the number of imaging lenses.

Preferably, the control unit (100) adjusts the position of the stage (ST) or the magnifying optical system based on the coordinates of the centroid of the aperture in the image of the shield.

Preferably, the control unit (110) adjusts the position of the stage (ST) or the magnifying optical system based on the coordinates of an edge of the aperture in the image of the shield. In some cases, the edge may be detected more accurately than the centroid.

According to still another aspect, the present disclosure provides an optical apparatus including a stage, a magnifying optical system, and an autofocus device described above.

According to yet another aspect, the present disclosure provides an optical apparatus including a stage, a magnifying optical system, and an autofocus device described above.

It should be understood that the embodiments and the examples disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

1, 105, 201, 251, 271: microscope; 11: AF laser; 13: beam expander; 19: glass; 20: sample; 22: AF camera; 23: excitation filter; 24: observation dichroic mirror; 25, 28: absorption filter; 26, L1, L2, L11, L11A, L211, L211A, L211B: imaging lens; 27: observation camera; 100, 110, 210: control unit; 101: position adjusting unit; 102: mirror angle adjusting unit; 103: stage position adjusting unit; 211: light source; 222: sensor; OL: objective lens; B1, B2: laser beam; BS: polarized beam splitter; DM: dichroic mirror; HM: half mirror; F: filter; M: electric mirror; QR: wave plate; RM1: rotating mirror, RM3: rotating mask; RP1, RP2: pattern; S: glass surface; SL: slit; ST: stage

The invention claimed is:

1. An autofocus device used in an optical apparatus equipped with a stage that supports a transparent member on which an observation object is placed, and a magnifying optical system which is used to observe the observation object, the autofocus device comprising:
- a light source device which emits a light beam to the observation object via the magnifying optical system;
- a shield which is arranged at a position opposite to the observation object relative to the magnifying optical system and configured to limit the light beam emitted from the light source device;
- a light detection unit which receives, via the magnifying optical system, a reflected light beam which is reflected from a reflection surface of the transparent member after the light beam emitted from the light source device reaches the reflection surface via the shield and the magnifying optical system; and
- a unit controller which controls a position of the stage or the magnifying optical system,
- the unit controller adjusting the position of the stage or the magnifying optical system based on a reflected light beam from the shield which is obtained by irradiating the observation object with the light beam which is emitted from the light source device and limited by the shield under a plurality of different conditions, wherein
- the light source device is configured to adjust an angle of the light beam relative to the shield.

2. The autofocus device according to claim 1, further including an optical element which reflects a part of the light beam emitted from the light source device and limited by the shield,
wherein the light beam emitted from the light source device and reflected by the optical element is incident on the observation object.

3. The autofocus device according to claim 1, further including an optical element which blocks, attenuates or reflects a part of the light beam emitted from the light source device and limited by the shield,
wherein a part of the light beam which is emitted from the light source device and is not blocked, attenuated and reflected by the optical element is incident on the observation object.

4. The autofocus device according to claim 1, wherein
the unit controller determines a control target value from a position of a reflection image of the shield obtained under the plurality of different conditions, and adjusts the position of the stage or the magnifying optical system accordingly.

5. The autofocus device according to claim 1, wherein
the unit controller determines a control target value from a light intensity which is obtained by dividing the image of the shield obtained under the plurality of different conditions into a plurality of sections and integrating the light intensity of each section, and adjusts the position of the stage or the magnifying optical system accordingly.

6. An optical apparatus comprising the autofocus device according to claim 1.

7. A microscope comprising the autofocus device according to claim 1.

* * * * *